US012696300B2

(12) United States Patent (10) Patent No.: US 12,696,300 B2
Abramov et al. (45) Date of Patent: Jul. 28, 2026

(54) OPTIMIZING POWER CONSUMPTION BY TRANSMIT CHANNEL OPTIMIZATION BASED ON TEMPERATURE IN A BEAMFORMING WIRELESS COMMUNICATIONS SYSTEM (WCS)

(71) Applicant: ANI Acquisition Sub, LLC, Boca Raton, FL (US)

(72) Inventors: Yury Abramov, Rosh HaAin (IL); Benjamin Imanilov, Hod haSharon (IL)

(73) Assignee: ANI Acquisition Sub, LLC, Boca Raton, FL (US)

( * ) Notice: Subject to any disclaimer, the term of this patent is extended or adjusted under 35 U.S.C. 154(b) by 554 days.

(21) Appl. No.: 17/993,062

(22) Filed: Nov. 23, 2022

(65) Prior Publication Data

US 2024/0172256 A1 May 23, 2024

(51) Int. Cl.
*H04W 72/51* (2023.01)
*H04B 7/06* (2006.01)

(52) U.S. Cl.
CPC .......... *H04W 72/51* (2023.01); *H04B 7/0617* (2013.01); *H04B 7/06952* (2023.05)

(58) Field of Classification Search
None
See application file for complete search history.

(56) References Cited

U.S. PATENT DOCUMENTS

| | | | |
|---|---|---|---|
| 9,497,706 B2 | 11/2016 | Atias et al. | |
| 2011/0268446 A1* | 11/2011 | Cune .................... | H04J 14/0298 |
| | | | 398/115 |
| 2018/0302891 A1* | 10/2018 | Bitra ...................... | H04W 64/00 |
| 2021/0289583 A1* | 9/2021 | Zhang .................. | H04B 7/0602 |
| 2022/0416860 A1* | 12/2022 | Hochdorf ............. | H04B 7/0602 |
| 2023/0225083 A1* | 7/2023 | He .......................... | G06F 1/203 |
| | | | 361/688 |
| 2024/0205846 A1* | 6/2024 | Wang .................. | H04W 52/367 |

* cited by examiner

*Primary Examiner* — Jae Y Lee
*Assistant Examiner* — Nam P. Cao
(74) *Attorney, Agent, or Firm* — Greenberg Traurig, LLP; Mammen ("Roy") P. Zachariah

(57) ABSTRACT

Optimizing power consumption by transmit signal optimization based on temperature in a beamforming antenna array(s) in a wireless communications system (WCS), and related methods and computer-readable media are disclosed. To manage and control the temperature of the wireless device from exceeding a desired temperature limit, a carrier control circuit is provided and configured to selectively control whether received transmit carriers (i.e. channels) are transmitted through the antenna array based on temperature of the wireless device. Heat generated by the wireless device and/or the antenna array is related to the number of carriers transmitted by the wireless device. The carrier control circuit can use temperature information to determine whether any carriers should be blocked (e.g., dropped) from transmission. Blocking carriers from being transmitted can reduce the number of RF circuit chains involved in transmitting a carrier signal, thus reducing heat generated by the wireless device and/or the antenna array.

33 Claims, 12 Drawing Sheets

FULL ARRAY WITH
PATIAL CARRIERS COUNT

PARTIAL ARRAY
IS ACTIVE

506B

506S

BLOCKED/FILTERED CHANNELS

TRANSMITTED CHANNELS

506

TRANSMITTED CHANNELS

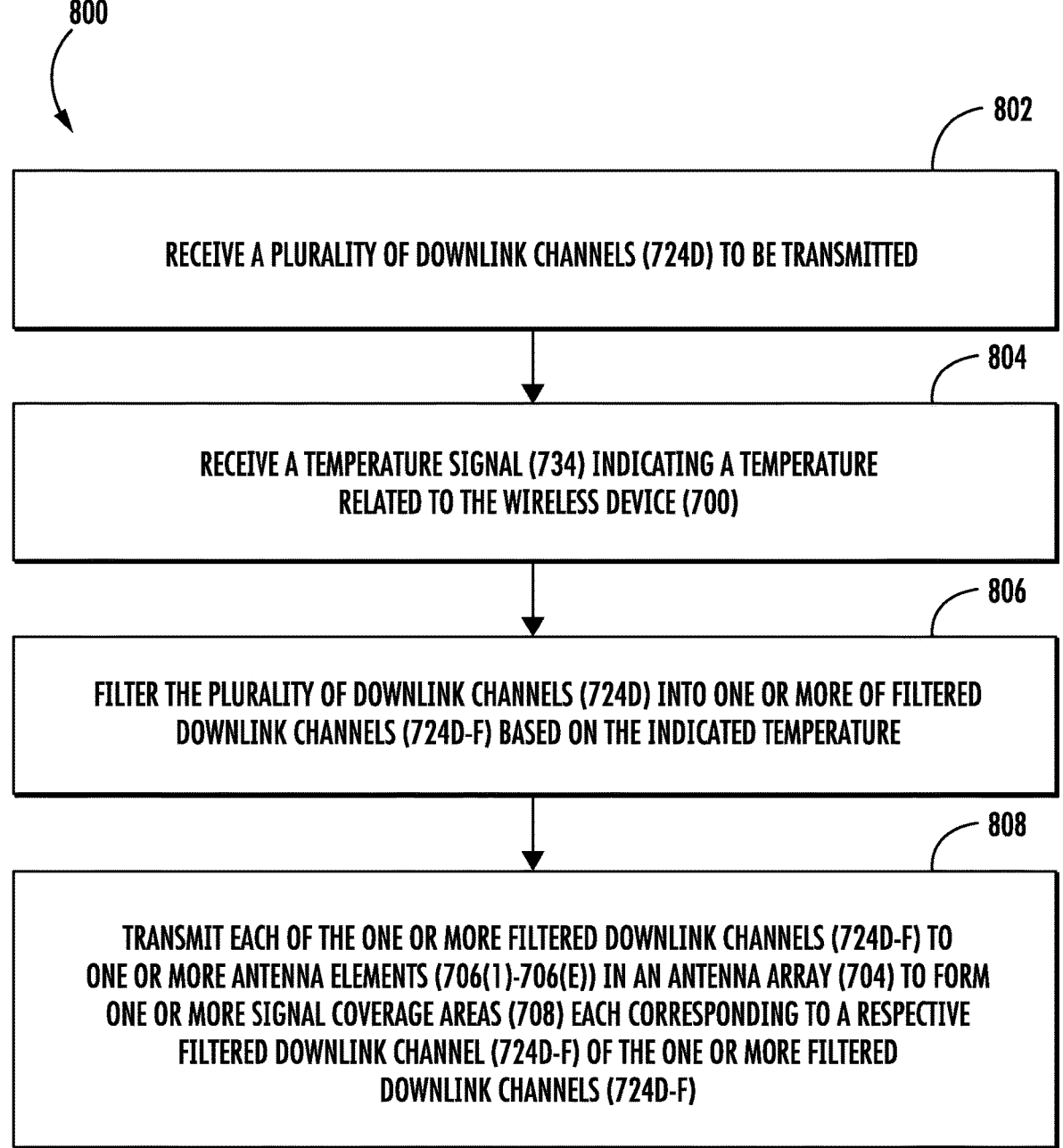

RECEIVE A PLURALITY OF DOWNLINK CHANNELS (724D) TO BE TRANSMITTED

RECEIVE A TEMPERATURE SIGNAL (734) INDICATING A TEMPERATURE
RELATED TO THE WIRELESS DEVICE (700)

FILTER THE PLURALITY OF DOWNLINK CHANNELS (724D) INTO ONE OR MORE OF FILTERED
DOWNLINK CHANNELS (724D-F) BASED ON THE INDICATED TEMPERATURE

TRANSMIT EACH OF THE ONE OR MORE FILTERED DOWNLINK CHANNELS (724D-F) TO
ONE OR MORE ANTENNA ELEMENTS (706(1)-706(E)) IN AN ANTENNA ARRAY (704) TO FORM
ONE OR MORE SIGNAL COVERAGE AREAS (708) EACH CORRESPONDING TO A RESPECTIVE
FILTERED DOWNLINK CHANNEL (724D-F) OF THE ONE OR MORE FILTERED
DOWNLINK CHANNELS (724D-F)

FIG. 8

OPTIMIZING POWER CONSUMPTION BY TRANSMIT CHANNEL OPTIMIZATION BASED ON TEMPERATURE IN A BEAMFORMING WIRELESS COMMUNICATIONS SYSTEM (WCS)

BACKGROUND

The disclosure relates generally to a wireless communication node (e.g., a macrocell radio, a small cell radio, a remote radio head (RRH)) in a wireless communications system (WCS) supporting beamforming. The WCS can include a Fifth Generation (5G) system, a 5G New Radio (5G-NR) system, and/or a distributed communications system (DCS), as examples.

Wireless communications is rapidly growing, with ever-increasing demands for high-speed mobile data communication. As an example, local area wireless services (e.g., so-called "wireless fidelity" or "Wi-Fi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio node/base station that transmits communications signals distributed over physical communications medium remote unit forming radio frequency (RF) antenna coverage areas, also referred to as "antenna coverage areas." The remote units each contain or are configured to couple to one or more antennas configured to support the desired frequency(ies) of the radio node to provide the antenna coverage areas. Antenna coverage areas can have a radius in the range from a few meters up to kilometers, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1A is an example of a wireless communications system (WCS) 100 that includes a radio node 102 configured to support one or more service providers $SP_1$-$SP_N$, 104(1)-104(N) as signal sources (also known as "carriers" or "service operators"—e.g., mobile network operator (MNO)) and wireless client devices 106(1)-106 (W). For example, the radio node 102 can be a component of a distributed antenna system (DAS) that is configured to distribute communications signal streams 108(1)-108(S) from the radio node 102 to the wireless client devices 106(1)-106(W) based on a downlink communications signal 110(1)-110(N) received from the service providers 104(1)-104(N). As another example, the radio node 102 may be a base station (eNodeB) that includes modem functionality. The communications signal streams 108(1)-108(N) are radiated through antennas 112 to the wireless client devices 106(1)-106(W) in communication range of the antennas 112. As another example, the radio node 102 in the WCS 100 in FIG. 1A can be a small cell radio access node ("small cell") that is configured to support multiple service providers

104(1)-104(N) by distributing a communications signal stream 108(1)-108(S) for the multiple service providers 104(1)-104(N) based on respective communications signals 110(1)-110(N) received from respective evolved packet cores (EPC) network $CN_1$-$CN_N$ of the service provider 104(1)-104(N) through interface connections. Small cells can support one or more service providers in different communications channels ("channels") within a frequency band to avoid interference and reduced signal quality as a result. Secure communications tunnels are formed between the wireless client devices 106(1)-106(W) and the respective service provider 104(1)-104(N). Thus, in this example, the radio node 102 essentially appears as a single node (e.g., Evolved Node B (eNodeB) in 4G or gNodeB in 5G) to the service provider 104(1)-104(N). The issue with this approach (sometimes called MOCN) is that the capacity enabled by the channels of the "site operator," which operates radio node 102, is divided between the service providers 104(1)-104(N). A better approach is where each service provider 104(1)-104(N) can use its own spectrum.

Massive Antenna Arrays (MAA) were introduced to enhance performance, in general, and in most cases in the case of a single service provider 104(1)-104(N), MAAs enhance performance by enabling techniques such as MU-MIMO and beamforming. A MAA includes a plurality of antenna elements that can support a number of users, support aggregated data rate, and increase the effective power with reduced interference. A MAA can be provided for each service provider $SP_1$-$SP_N$ supported in a communications system. The WCS 100 can also be configured to support beamforming with a single MAA shared by multiple supported service providers $SP_1$-$SP_N$. For example, the antenna 112 in the WCS 100 in FIG. 1A can be a MAA 114 as shown in FIG. 1B. A MAA 114 contains a plurality of antenna elements 116(1)-116(E), for example sixty-four (64) antenna elements. Beamforming or spatial de-multiplexing is a signal processing technique used in wireless communications for directional signal transmission and/or reception. This is achieved by combining antenna elements in an antenna array in a way that signals, at particular angles, experience of constructive interference while others experience of destructive interference. Beamforming can be used at both the transmitting and receiving ends in order to achieve spatial selectivity. For example, the front end of 5G radio nodes, especially at frequencies above 2.5 Gigahertz (GHz), may include a MAA and supporting RF processing circuit elements. Beamforming can be used to improve signal-to-noise ratio (SNR) for overcoming the limiting factor of drop in signal strength as a function of distance. Beamforming can be used to improve signal-to-interference ratio (SIR) limiting radiation to undesired direction reducing interference to users served by other beams and/or other cells. The overall power assigned to transmitted signals distributed over radio resources can be controlled to increase signal bandwidth with a reduced SNR.

The size and number of antenna elements 116(1)-116(E) in the MAA 114 depends on the frequencies and spatial isolation to be supported by a site operator circuit 118 in the radio node 102. The site operator circuit 118 in FIG. 1A is configured to create multiple simultaneous signal beams ("beams") 120(1)-120(N) for the communications signal streams 108(1)-108(S) that are orthogonal by meaning of spatial multiplexing/space-division multiplexing from each other to serve multiple wireless client devices 106(1)-106 (W) simultaneously. For example, the multiple beams 120 (1)-120(N) may support multiple-input, multiple-output (MIMO) communications. The radio node 102 and MAA 114 are designed to support a maximum number of simultaneous beams 120(1)-120(N). The number of antenna elements 116(1)-116(E) in the MAA 114 dictates the maximum theoretically possible number of supported beams 120(1)-120(N) and shape of each and every beam. Radio signal processing resources in the radio node 102 can be shared to support the multiple service providers 104(1)-104(N). The capacity supported by the radio node 102 is split between the multiple service providers 104(1)-104(N). Beamforming can also be used to focus the beams 120(1)-120(N) to achieve increased communications range with increased signal quality (e.g., increased SNR by concentrating radiated energy in specific direction and increase SIR by the reducing interference that results from spatial isolation with other beams 120(1)-120(N). For example, the communications system 100 in FIG. 1A that supports multiple service providers 104(1)-104(N) and beamforming may be deployed in a building environment 200 as shown in FIG. 2. The capacity of the communications system 100 can be increased and multiplied by the number of simultaneous beams 120(1)-120(N) provided with sufficient isolation. MAAs, especially for the sub 6 GHz frequency range, might capture a significant area. For example, a MAA for 3.5 GHz band may typically include thirty-two (32) to sixty-four (64) antenna elements with or without cross polarization arrangement at typical sizes of 13.4"×6.7" and 26.8"×13.4", respectively.

A drawback of using the MAA 114 in the WCS 100 in FIG. 1A to support beamforming can be the complexity, size, and cost of the MAA 114 and related electronic circuitry as well as higher power consumption due to multiple antenna elements 116(1)-116(E) being coupled and driven by RF chain circuits to form signal beams 120(1)-120(N).

No admission is made that any reference cited herein constitutes prior art. Applicant expressly reserves the right to challenge the accuracy and pertinency of any cited documents.

SUMMARY

Embodiments disclosed herein include optimizing power consumption by transmit channel optimization based on temperature in a beamforming wireless communications system (WCS). Related methods and computer-readable media are also disclosed. For example, the WCS can include a macrocell radio access network (RAN), a small cell RAN, and/or a distributed antenna system, as examples. The WCS includes a number of wireless devices, such as remote units (e.g., radio nodes, small cell radio nodes, base stations, remote antenna units) that are typically mounted on a fixed structure (e.g., ceiling, wall, lamp post, etc.) to provide coverage for user devices. Each wireless device can include one or more antenna arrays or be coupled to one or more antenna arrays. Each antenna array can be controlled via a set of codewords to form one or more radio-frequency (RF) transmit beams (e.g., initial access and other broadcasted beams) to each cover a respective area in a coverage cell or antenna area. In embodiments disclosed herein, to manage and control the temperature of the wireless device from exceeding a desired temperature limit, a channel control circuit is provided. The channel control circuit is configured to selectively control whether received transmit communications channels ("channels") are transmitted through the antenna array based on a temperature of the wireless device. Heat generated by the wireless device and/or the antenna array (and thus its ambient temperature) is related to overall transmitted bandwidth multiplied by power spectral density (e.g., measured in Watt/Hz). For fixed power spectral density, heat generated by the wireless device and/or the antenna array is related to the number and bandwidth of channels transmitted by the wireless device. The carrier control circuit can use temperature information to determine whether number of channels should be reduced (e.g. what channels should be blocked or dropped) from transmission through the antenna array. Blocking channels from being transmitted can reduce overall sum of channels' bandwidth of transmitted signals, thus reducing heat generated by the wireless device and/or the antenna array.

As an example, the channel control circuit can be provided in the wireless device or coupled to the wireless device. A temperature sensor can be provided in or adjacent to the wireless device and/or the antenna array to measure temperature and to provide a temperature signal indicative of such temperature to the channel control circuit. The temperature sensor may be located to measure an ambient temperature around the wireless device and/or the antenna array as an indication of the heat generated by the wireless device and/or the antenna array.

One exemplary embodiment of the disclosure relates to a wireless device. the wireless device comprises a channel control circuit configured to receive a plurality of downlink channels to be transmitted; receive a temperature signal indicating a temperature related to the wireless device; and filter the plurality of downlink channels into one or more of filtered downlink channels based on the indicated temperature. The wireless device also comprises a transmission circuit configured to transmit each of the one or more filtered downlink channels to one or more antenna elements in an antenna array to form one or more signal coverage areas each corresponding to a respective filtered downlink channel of the one or more filtered downlink channels.

An additional exemplary embodiment of the disclosure relates to a method of selectively controlling transmission of communications channels through an antenna array in a wireless communications system (WCS). The method comprises receiving a plurality of downlink channels to be transmitted. The method also comprises receiving a temperature signal indicating a temperature related to a wireless device. The method also comprises filtering the plurality of downlink channels into one or more of filtered downlink channels based on the indicated temperature. The method also comprises transmitting each of the one or more filtered downlink channels to one or more antenna elements in an antenna array to form one or more signal coverage areas each corresponding a respective filtered downlink channel of the one or more filtered downlink channels.

An additional exemplary embodiment of the disclosure relates to WCS. The WCS comprises a central unit configured to distribute a plurality of downlink channels over a plurality of downlink communications links to a plurality of wireless devices; and distribute a plurality of uplink channels from the plurality of wireless devices received on a plurality of uplink communications links. The WCS also comprises a plurality of antenna arrays. The WCS also comprises the plurality of wireless devices each configured to receive a first plurality of downlink channels of the plurality of downlink channels to be transmitted from a downlink communications link of the plurality of downlink communications links; receive a temperature signal indicating a temperature related to the wireless device; filter the first plurality of downlink channels into first one or more filtered downlink channels based on the indicated temperature; transmit each of the first one or more filtered downlink channels to one or more antenna elements in an antenna array of the plurality of antenna arrays to form one or more signal coverage areas each corresponding a respective first filtered downlink channel of the first one or more filtered downlink channels; and receive a first plurality of uplink channels; and distribute the first plurality of uplink channels of the plurality of uplink channels on the first uplink communication link of the plurality of uplink communications links to the central unit.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 8 is a flowchart of an exemplary process of selectively control whether received transmit channels are transmitted by a wireless device through an antenna array based on a temperature of the wireless device;

DETAILED DESCRIPTION

Embodiments disclosed herein include optimizing power consumption by transmit channel optimization based on temperature in a beamforming wireless communications system (WCS). Related methods and computer-readable media are also disclosed. For example, the WCS can include a macrocell radio access network (RAN), a small cell RAN, and/or a distributed antenna system, as examples. The WCS includes a number of wireless devices, such as remote units (e.g., radio nodes, small cell radio nodes, base stations, remote antenna units) that are typically mounted on a fixed structure (e.g., ceiling, wall, lamp post, etc.) to provide coverage for user devices. Each wireless device can include one or more antenna arrays or be coupled to one or more antenna arrays. Each antenna array can be controlled via a set of codewords to form one or more radio-frequency (RF) transmit beams (e.g., initial access and other broadcasted beams) to each cover a respective area in a coverage cell or antenna area. In embodiments disclosed herein, to manage and control the temperature of the wireless device from exceeding a desired temperature limit, a channel control circuit is provided. The channel control circuit is configured to selectively control whether received transmit communications channels ("channels") are transmitted through the antenna array based on a temperature of the wireless device. Heat generated by the wireless device and/or the antenna array (and thus its ambient temperature) is related to overall transmitted bandwidth multiplied by power spectral density (e.g., measured in Watt/Hz). For fixed power spectral density, heat generated by the wireless device and/or the antenna array is related to the number and bandwidth of channels transmitted by the wireless device. The carrier control circuit can use temperature information to determine whether number of channels should be reduced (e.g., what channels should be blocked or dropped) from transmission through the antenna array. Blocking channels from being transmitted can reduce overall sum of channels' bandwidth of transmitted signals, thus reducing heat generated by the wireless device and/or the antenna array.

Figures 4A, 4B, 4C:
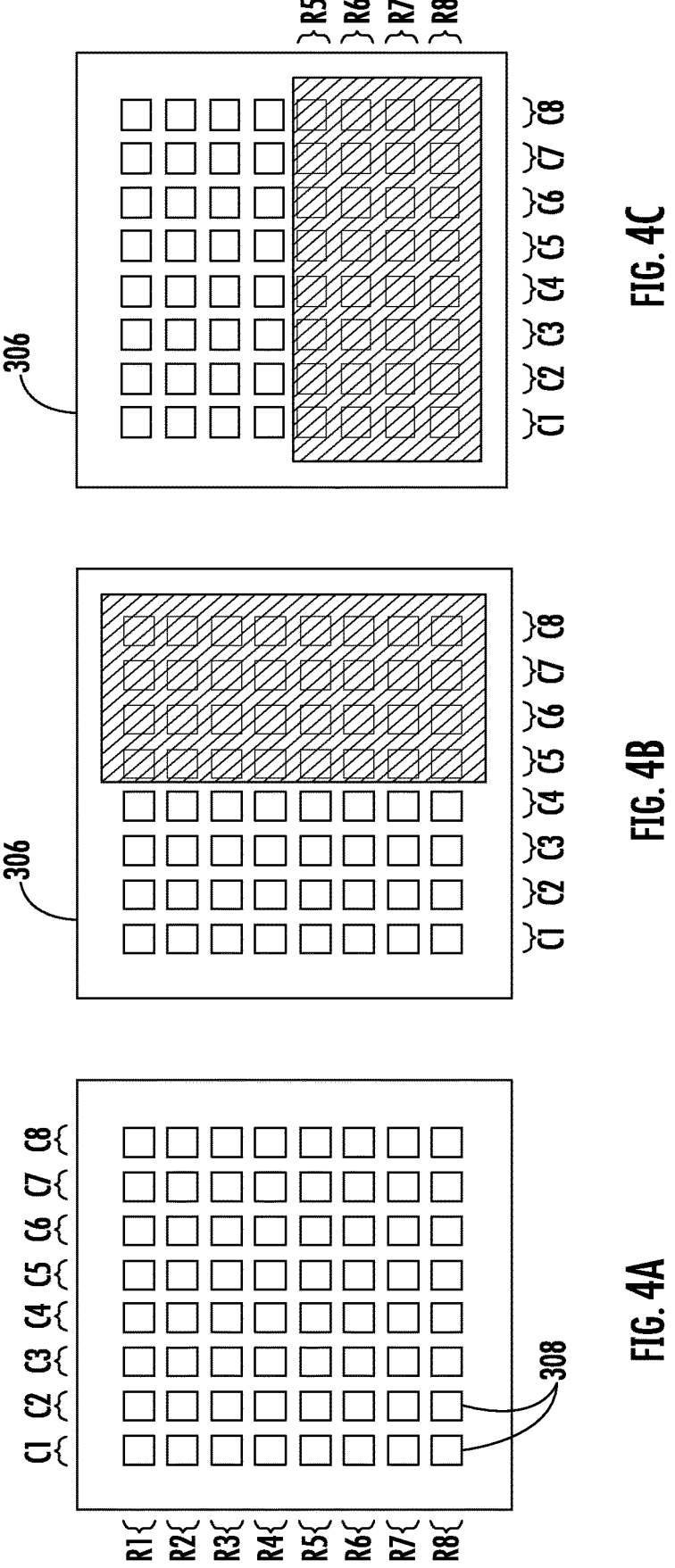
FIGS. 4A-4C are schematic diagrams of an antenna array that show full activation and partial activation of the antenna elements of the antenna array.
Figures 5A, 5B, 5C:
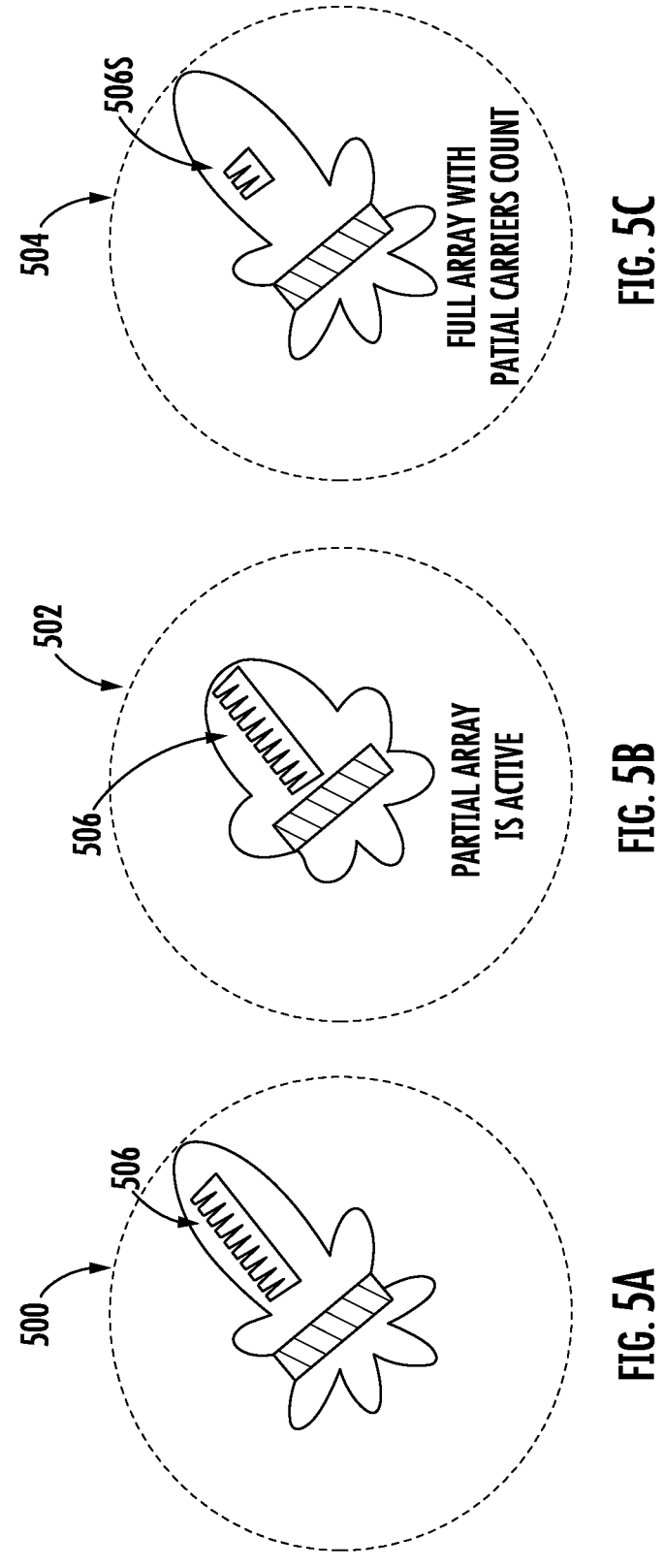
FIGS. 5A-5C are schematic diagrams that illustrate antenna coverages in the antenna array based on the activation of antenna elements in respective diagrams of the antenna array in FIGS. 4A-4C.
Figures 6A, 6B:
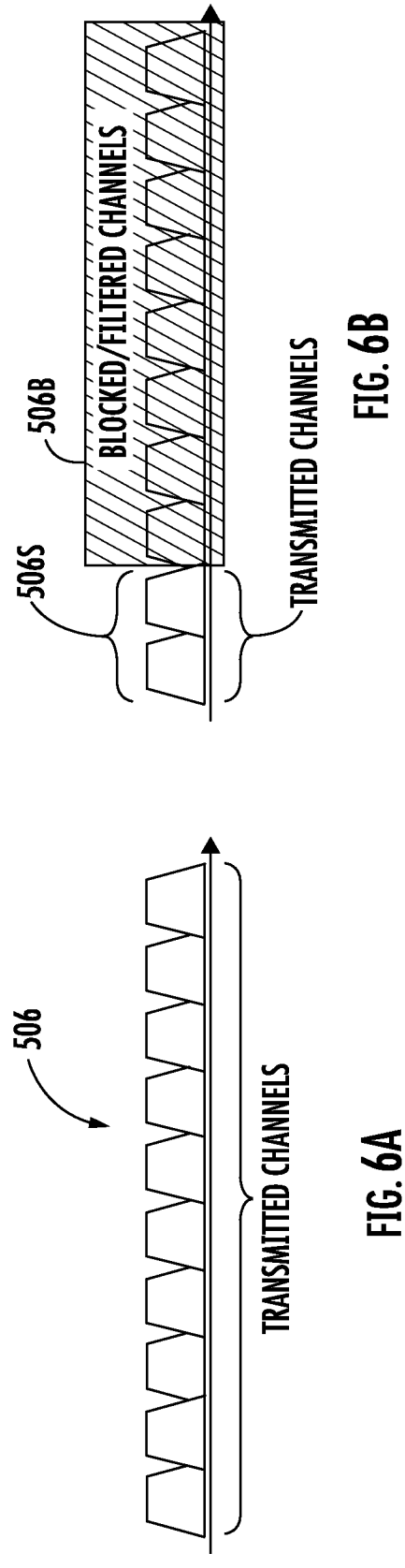
FIGS. 6A-6B are schematic diagrams illustrating the selective control of a channel transmission by a wireless device to manage power.

Before discussing examples of wireless devices and WCSs that include wireless devices that are configured to selectively control whether received transmit channels are transmitted through the antenna array based on a temperature of the wireless device starting at FIG. 6A, an exemplary beamforming WCS that includes wireless devices that are not configured to selectively control distribution of transmit channels based on a temperature of the wireless device is first described with regard to FIGS. 3-5C.

Figures 1A, 1B:
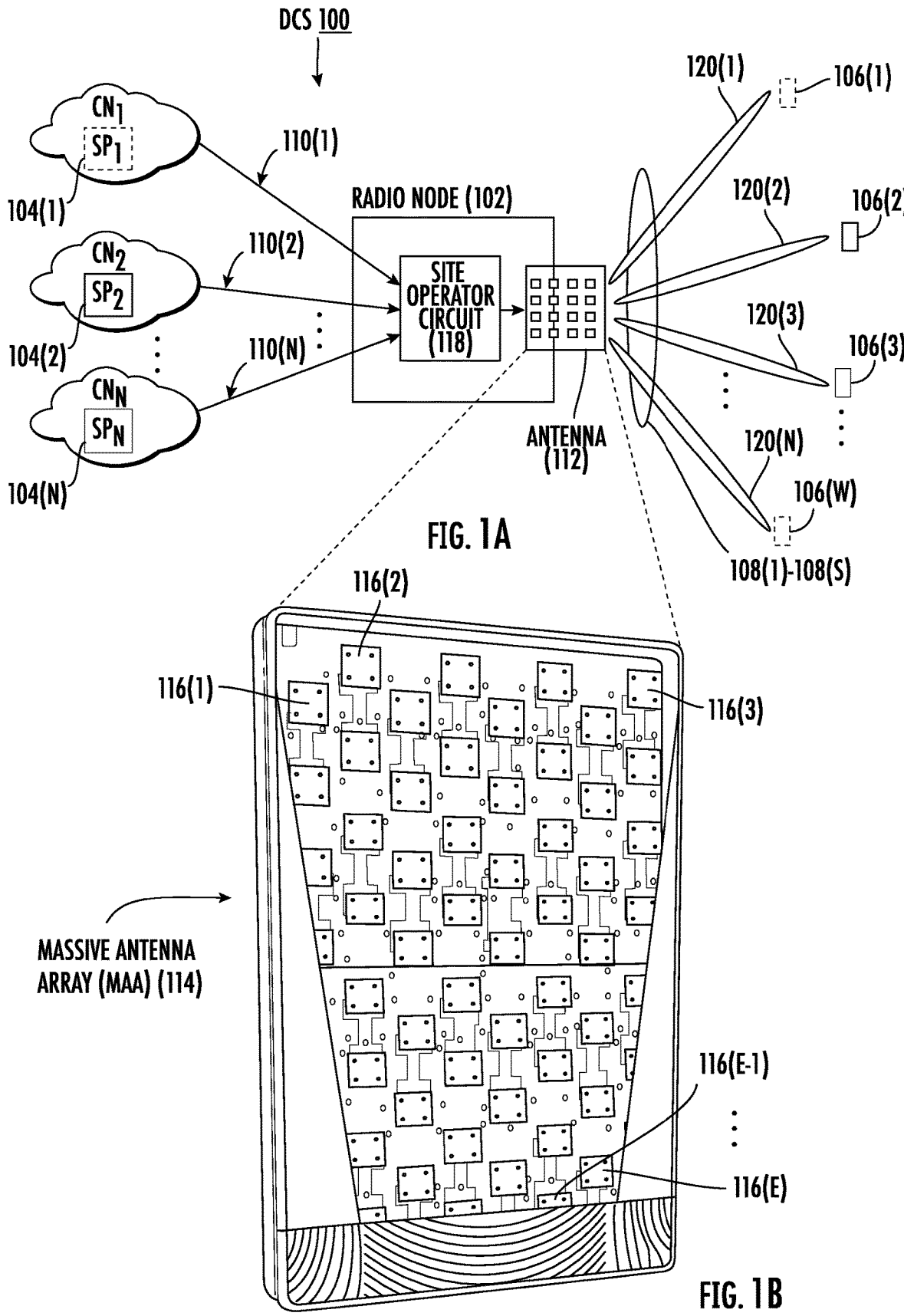
FIG. 1A is a schematic diagram of an exemplary wireless communications system (WCS) that includes a conventional single operator radio node that includes a massive antenna array (MAA) to support distribution of communications signals for multiple service providers.
FIG. 1B is an example of the MAA for the single operator radio node in FIG. 1A.
Figure 2:
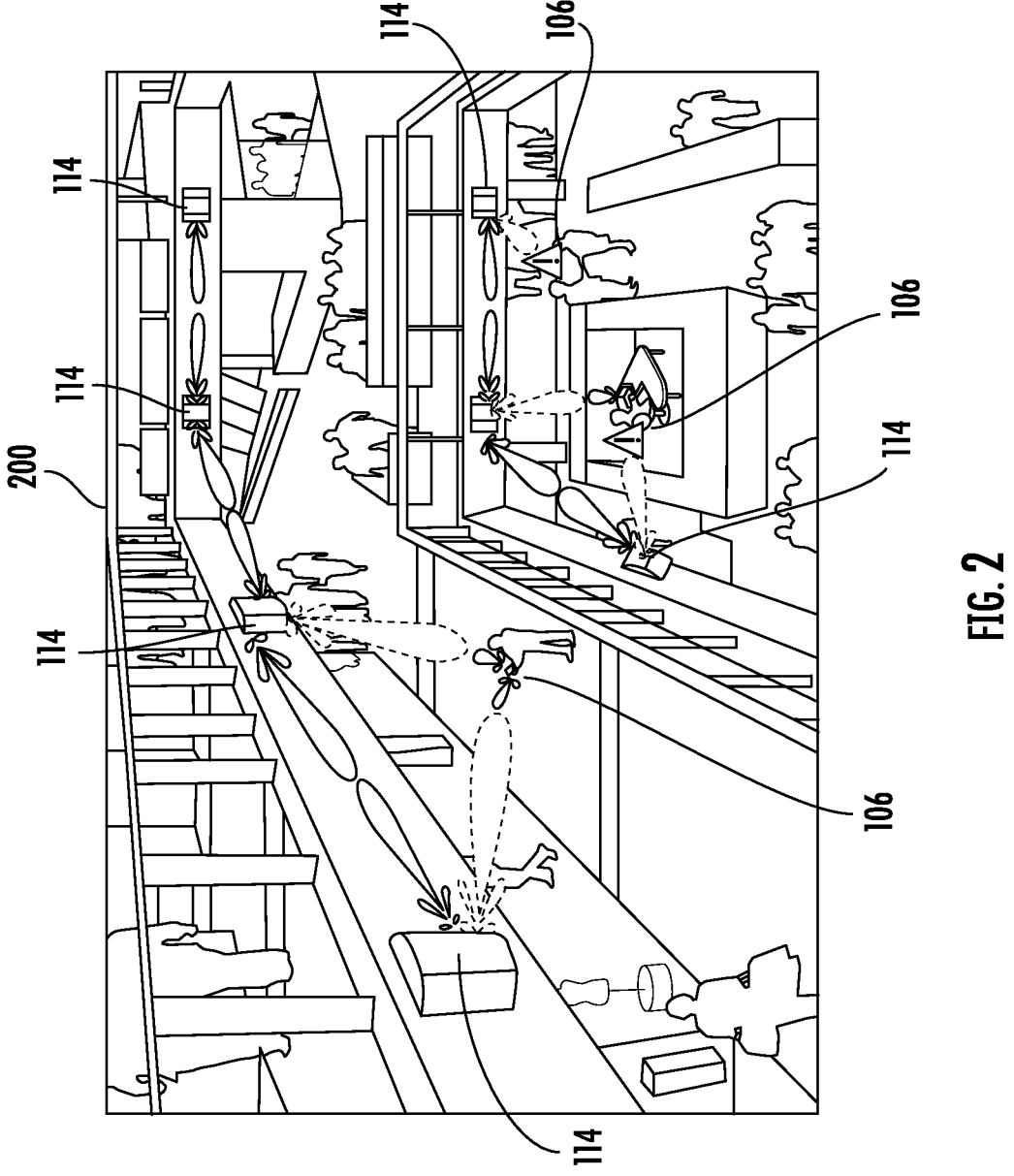
FIG. 2 is an example of a building environment where MAAs are deployed and configured to radiate multiple beams to wireless client devices within the building environment.
Figure 3:
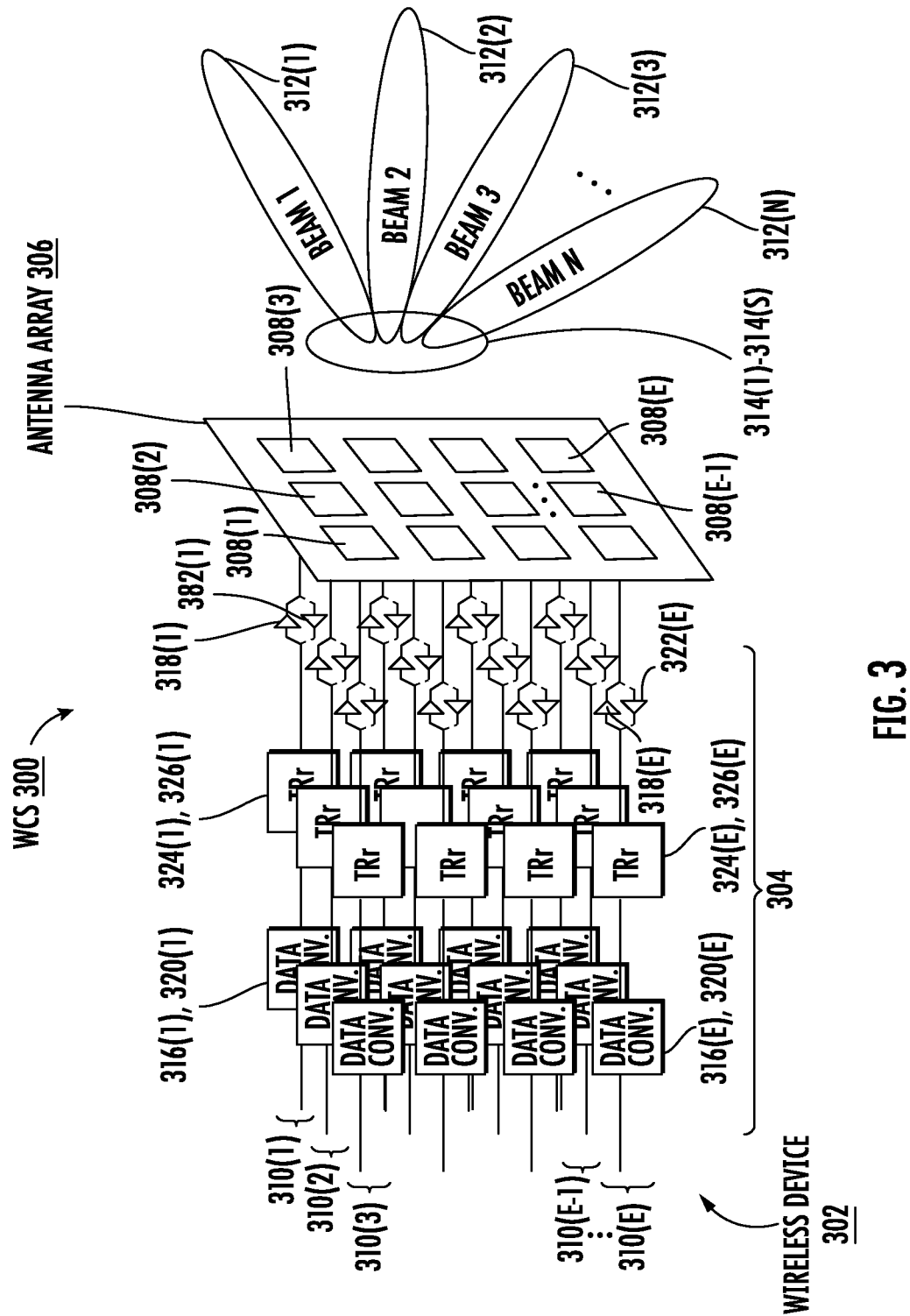
FIG. 3 is an example of a fully digital beamforming circuit that can be employed in the radio node in the WCS in FIG. 1A to support digital beamforming communications signals for multiple service providers using shared radio resources.

In this regard, FIG. 3 illustrates a conventional fully digital beamforming WCS 300 that includes a wireless device 302 in the form of a radio node 304. As shown in FIG. 3, the WCS 300 also includes an antenna array 306 that includes a plurality of antenna elements 308(1)-308(E) each coupled to a separate RF chain circuit 310(1)-310(E). The size and number of antenna elements 308(1)-308(E) in the antenna array 306 depends on the frequencies and spatial isolation to be supported by wireless device 302. Note that only one wireless device 302 is shown in FIG. 3, but a plurality of wireless devices 302 each coupled to a respective dedicated antenna array 306 can be provided in the WCS 300. The wireless device 302 is configured to create multiple simultaneous signal beams ("beams") 312(1)-312(N) for the communications signal streams 314(1)-314(S) that are orthogonal by meaning of spatial multiplexing/space-division multiplexing from each other to serve multiple wireless client devices simultaneously. For example, the multiple beams 312(1)-312(N) may support multiple-input, multiple-output (MIMO) communications. The wireless device 302 and antenna array 306 can be designed to support a maximum number of simultaneous beams 312(1)-312(N). The number of antenna elements 308(1)-308(E) in the antenna array 306 dictates the maximum theoretically possible number of supported beams 312(1)-312(N) and shape of each and every beam. Radio signal processing resources in the wireless device 302 can be shared to support the multiple service providers. The capacity supported by the wireless device 302 is split between the multiple service providers. Beamforming can also be used to focus the beams 312(1)-312(N) to achieve increased communications range with increased signal quality (e.g., increased signal-to-noise ratio (SNR). Beamforming can be used to improve signal-to-interference ratio (SIR) limiting radiation to undesired direction reducing interference to users served by other beams 312(1)-312(N). The capacity of the WCS 300 can be increased and multiplied by the number of simultaneous beams 312(1)-312(N) provided with sufficient isolation.

With continuing reference to FIG. 3, to provide for the WCS 300 to support full digital beamforming capability, the separate RF chain circuits 310(1)-310(E) are provided in the wireless device 302 with each coupled to a separate antenna element 308(1)-308(E) in the antenna array 306. Each RF chain circuit 310(1)-310(E) in this example includes a dedicated downlink digital-to-analog (D/A) converter 316 (1)-316(E), a downlink power RF amplifier circuit 318(1)-318(E), uplink analog-to-digital (A/D) converter 320(1)-320 (E), an uplink RF amplifier circuit 322(1)-322(E) (e.g., a low noise amplifier (LNA)), a downlink transmitter circuit 324 (1)-324(E), and an uplink receiver circuit 326(1)-326(E). If the antenna array 306 includes sixty-four (64) antenna element 308(1)-308(E), where 'E' was equal to sixty-four (64), this would mean in this example that sixty-four (64) separate RF chain circuits 310(1)-310(E) would be provided, adding size and cost. Every communication signal provided through the RF chain circuits 310(1)-310(E) is processed individually by the wireless device 302, thus adding processing complexity in the wireless device 302.

Alternatively, the WCS 300 in FIG. 3 could also be provided as an analog beamforming system in which one source would feed all the antenna elements 308(1)-308(E) of the antenna array 306 by a power divider circuit, wherein each feed is controlled by a separate analog vector modulator. As another alternative, the WCS 300 in FIG. 3 could also be provided as a communication system that is a hybrid digital-analog beamforming system that is configured to form digital signal streams for the spectrum of the service providers for a specific analog phase. The hybrid digital-analog beamforming system could combine the digital signal streams of the spectrum of the service providers directed to a same sub-array of antenna elements 308(1)-308(E) in the antenna array 306. The digital signal streams can then be phase shifted according to a phase shift control signal to form signal beams in individual spectrum layers of the service providers.

A drawback of using the antenna array 306 in the WCS 300 to support beamforming in any form (e.g., fully digital, analog, or hybrid digital-analog) can be the complexity, size, and cost of the antenna array 306 and related electronic circuitry, as well as higher power consumption. This is because in beam forming, a plurality of the antenna elements 308(1)-308(E) in the antenna array 306 are driven by one or more RF chain circuits, such as RF chain circuits 310(1)-310(E), to form the beams 312(1)-312(N), the wireless device 302 can consume a large amount of power depending on the number of beams 312(1)-312(N) formed. For example, for the case of beam forming antenna arrays like the antenna array 306 in FIG. 3, the Effective Isotropic Radiated Power (EIRP) of the beams 312(1)-312(N) radiated by antenna elements 308(1)-308(E) of the antenna array 306 determines the distance of transmission with adequate signal quality (where the expected data throughput is complying with the requirements) together with the pathlosses impacted also by the environment. Since beamforming wireless devices, like wireless device 302 in FIG. 3, includes a large number of transmit and receive paths that include one or more dedicated or shared RF chain circuits, these wireless devices consume a lot of power (e.g., close to 100 W for lower power EIRP for a small cell RAN).

For example, the general case for power consumed for each antenna element 308(1)-308(E) (i.e., antenna port) in the antenna array 306 in the WCS 300 in FIG. 3 can be provided by the following equations:

$$\text{Max EIRP [dBm]}=(Pe+Ge+10 \log 10(m{\times}n))+10 \log 10(m{\times}n)=Pe+Ge+20 \log 10(m{\times}n); \text{ and}$$

$$\text{EIRP [dBm]}=Pe+Ge+20 \log 10(m{\times}n);$$

wherein:
EIRP is the Effective Isotropic Radiated Power;
m=number of antenna elements 308 in a row of m×n antenna array 306;
n=number of antenna elements 308 in a column of m×n antenna array 306;
K=number of feeders for the antenna array 306 (for digital beam forming, this will be m×n; for hybrid beamforming it should be determined by the antenna array 306 and feeding network structure);
Ge=antenna element 308 gains in [dBi]; and
Pe=Power fed at the antenna element 308/antenna port.

In the case of the antenna array 306 with m×n antenna elements 308(1)-308(E), where there are m×n feeds to the antenna array 306, the formula for EIRP can be simplified as follows:

$$\text{EIRP [dBm]}=20 \log(m \times n)+Ge+Pe$$

FIG. 4A illustrates K=64 antenna elements 308(1)-308(E) in each of rows R1-R8 columns C1-C8 of an 8×8 (m×n) antenna array 306 are being driven with signals to form beams. Thus, in this example, for antenna array 306 of m×n=K antenna elements 308(1)-308(E), if K/2 antenna elements 308(1)-308(E) of the antenna array 306 are being driven with signals to form beams, as shown in FIGS. 4B and 4C, EIRP drops by 6 dB. FIG. 4B illustrates K/2 antenna elements 308(1)-308(E) in columns C5-C8 of the antenna array 306 are being driven with signals to form beams. FIG. 4C illustrates K/2 antenna elements 308(1)-308(E) in rows R5-R8 of the antenna array 306 are being driven with signals to form beams. FIG. 5A is a schematic diagram illustrating an antenna coverage 500 provided by the antenna array 306 in FIG. 3 based on all of its antenna elements 308(1)-308(E) being driven with signals as shown FIG. 4A. FIG. 5B is a schematic diagram illustrating an antenna coverage 500 provided by the antenna array 306 in FIG. 3 based on half of its antenna elements 308(1)-308(E) being driven with signals as shown FIGS. 4B and 4C. FIG. 5C is a schematic diagram illustrating an antenna coverage 504 provided by the antenna array 306 driven by the wireless device 302 in FIG. 3, based on all of its antenna elements 308(1)-308(E) being driven with signals as shown FIGS. 4B and 4C, but only a subset of downlink channels 506S received by the wireless device 302 are transmitted, as compared to the antenna coverage 500 in FIG. 5A when all channels 506 received by the wireless device 302 are transmitted.

One of the important challenges for a wireless device, including the wireless device 302 in the WCS 300 in FIG. 3, is the wireless device's 302 operational ambient temperature range and the capability to dissipate the heat generated by its electronic components. The wireless device 302 will have a temperature limit which, when exceeded, can negatively affect its performance and/or cause electronics components in the wireless device 302 (including in its RF chain circuits 310(1)-310(E)) to malfunction. Heat dissipation measures, such as heat sinks, can be provided in the wireless device 302. However, the environment and ambient temperature of the wireless device 302 may greatly vary. Once the wireless device 302 runs in an ambient temperature which is close to its maximum specified temperature, the wireless device 302 gets very close to maximum junction/case temperature specified to its components. Thus, it may be required to reduce the power consumption by the wireless device 302 to enable the wireless device 302 to cool down to lower its case and component temperatures. For example, the wireless device 302 may be configured to reduce power consumption by shutting down parts of the antenna array 306 by control of the RF chain circuits 310(1)-310(E) for a period of time. However, this solution will reduce the coverage radius of the wireless device 302 and affect its ability to form beams 312(1)-312(E) of the desired shape due to reduced engagement of the RF chain circuits 310(1)-310(E) that can be employed to create the beams 312(1)-312(E).

In this regard, as discussed in examples below, wireless devices are provided that can be configured to selectively control whether received transmit communications channels ("channels") are transmitted through an antenna array based on a temperature of the wireless device. A wireless channel is a specific division of frequencies in a specific wireless band. The wireless devices are provided in a WCS and are capable of forming RF beams from received downlink signals in downlink channels (i.e., beamforming) to be transmitted through an antenna array. Heat generated by the wireless device and/or the antenna array (and thus its ambient temperature) is related to overall transmitted bandwidth multiplied by power spectral density (e.g., measured in Watt/Hz). For fixed power spectral density, heat generated by the wireless device and/or the antenna array is related to the number and bandwidth of channels transmitted by the wireless device The channel control circuit can use temperature information to determine whether any channels should be blocked (e.g., dropped) from transmission through the antenna array. Blocking channels from being transmitted can reduce the number of RF circuit chains actively involved in transmitting a channel signal, thus reducing heat generated by the wireless device and/or the antenna array. Thus, one way to reduce power consumption is to selectively control or block certain channels from being transmitted. This is shown in FIGS. 6A and 6B, wherein FIG. 6A represents all received channels 506 being transmitted, and FIG. 6B represents only a subset of downlink channels 506S being transmitted with other channels 506B blocked from being transmitted.

If the wireless device 302 in the WC S 300 in FIG. 3 were to receive N carriers with EIRP of $P_{[dbm]}$ each, then the total EIRP will be:

$$\text{EIRP Total}=P_{[dbm]}+10 \log(N)$$

For example, if the wireless device 302 were transmitting ten (10) channels of 100 MHz, and due to the temperature of wireless device 302, the system shuts down transmission of certain channels, as an example:

for 2 channels down, the total EIRP drops by 20% which is close to 1 dB drop;

for 5 channels down, the total EIRP drops by 50% which is close to 3 dB drop; and for 9 channels down, the total EIRP drops by almost 90% which is close to 10 dB drop.

In all these above cases, the EIRP of the live channels is maintained. Thus, by the wireless device being configured to selectively control and block transmission of certain downlink channels based on a temperature of the wireless device, a realized benefit of reducing channel count (total output power/total EIRP) is maintaining channel EIRP of the subset of transmitted channels. This is opposed to reducing the number of antenna elements activated in the antenna array for downlink transmission, wherein the EIRP (per channel) may drop by 20 log (K) which is two (2) times more drop than blocking transmission of certain channels while allowing all of the antenna elements be activated in the antenna array for downlink transmission. For example, reducing the number of active antenna elements in an antenna array from E to E/2 may reduce EIRP by 6 dB (4 times less), wherein by blocking the number of channels transmitted from K to K/2, the EIRP may be reduced by 3 dB (only 2 times). Simply switching off part of antenna elements of an antenna array, when the remainder of the antenna elements transmit according to a previously designed power spectral density without a change in transmitted power and without change in number of channels, will reduce SNR. In this case, users on the edge of coverage area will not be able to receive data (any channel) because of lower SNR. However, reducing number of active channels while leaving all antenna elements active and transmitting according to previously defined power spectral density but with reduced number of channels, will preserve SNR—so users will receive less channels (i.e. less data) but still will be able to communicate. The antenna coverage is maintained as every transmitted channel that is not blocked has an EIRP of $EIRP_{Total}/K$ (total EIRP divided by K channels). Thus, antenna coverage is maintained for the reduced number of channels so coverage maintains, providing adequate service coverage. The new EIRP of the wireless device by transmission of a reduced number of channels is now divided by number of channels to calculate the channel EIRP.

Figure 7:
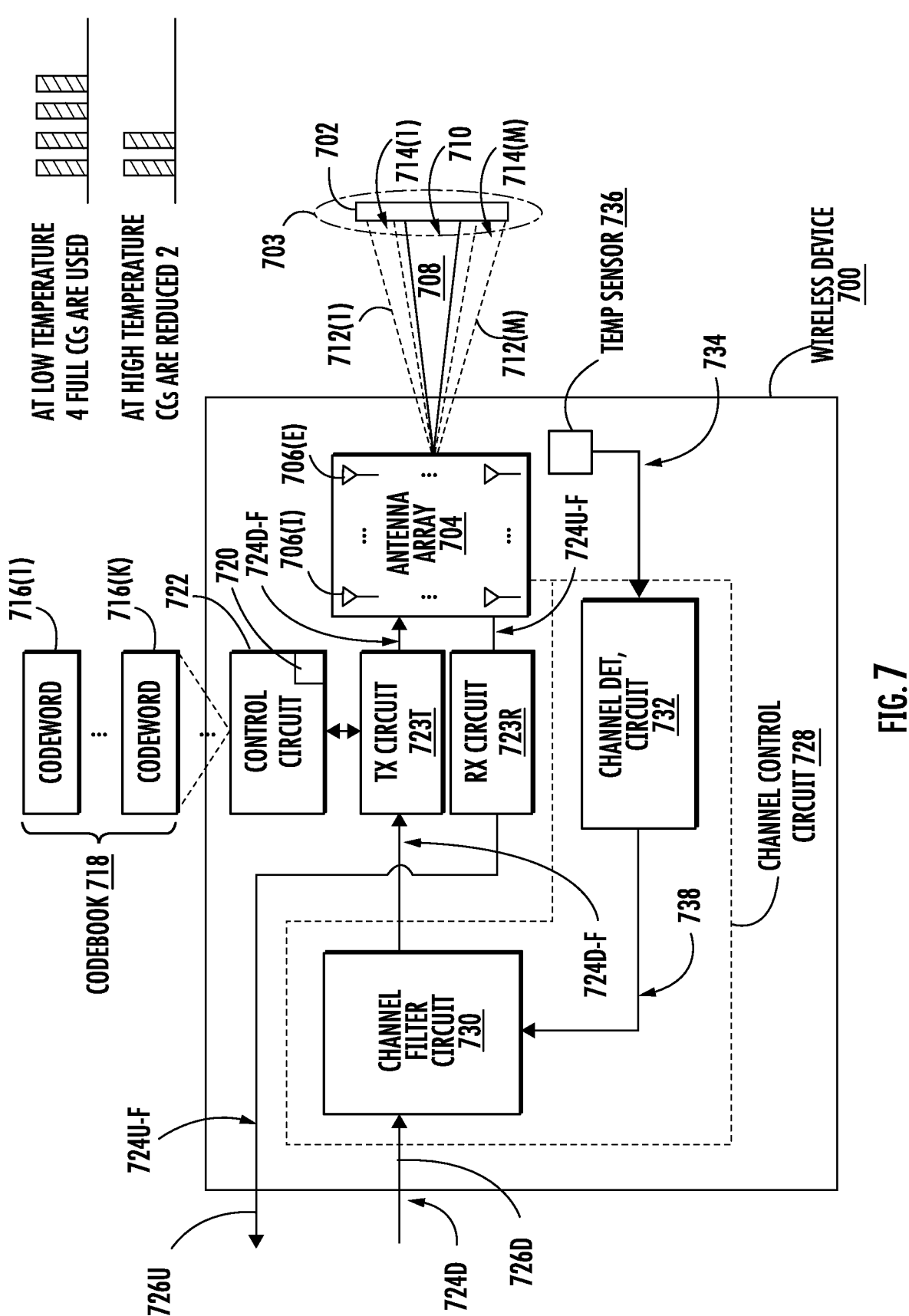
FIG. 7 is a schematic diagram of an exemplary wireless device that can be included in a WCS, including but not limited to the WCS in FIG. 3, wherein the wireless devices include a channel control circuit configured to selectively control whether received transmit channels are transmitted through an antenna array based on a temperature of the wireless device.

In this regard, FIG. 7 is a schematic diagram of an exemplary wireless device 700 configured to selectively control whether received transmit channels are transmitted through an antenna array 704 based on a temperature relating to the wireless device 700. The wireless device 700 can be included a WCS, including but not limited to the WCS 300 in FIG. 3. Note that FIG. 7 illustrates only a single wireless device 700 coupled to a single antenna array 704, but note that multiple wireless devices 700 could be provided in a WCS. In this example, the antenna array 704 is part of the wireless device 700, but such is not limiting. The antenna array 704 may be provided outside or remote from the wireless device 700 depending on the design of the wireless device 700 and its application. Also note that multiple antenna arrays 704 could also be provided, such as for example, if the wireless device 700 was capable of supporting multiple operators, wherein the wireless device 700 was interfaced to separate antenna arrays 704 dedicated to each operator. The wireless device 700 can be a macrocell radio node, a small cell radio node, a remote radio head (RRH), and a remote antenna system, as non-limiting examples.

Before discussing the aspects of the wireless device 700 being configured to selectively control whether received transmit channels are transmitted through an antenna array 704 based on a temperature relating to the wireless device 700, other aspects of the wireless device 700 are first discussed immediately below.

With continuing reference to FIG. 7, the wireless device 700 in this example includes the antenna array that includes a plurality of antenna elements 706(1)-706(E). In an embodiment, the antenna elements 706(1)-706(E) are provided in M rows and N columns (M and N are positive integers) to thereby form an M×N grid of antenna elements. In an embodiment, the antenna elements 706(1)-706(E) are equally spaced in the M×N grid in the antenna array 704(1). In an embodiment, the antenna array 704 is configured to form a main transmit, downlink RF beam 708 to provide a uniform coverage in a main coverage area 710 in a respective coverage cell 702. In addition, the antenna array 704 may also be configured to form a plurality of side RF beams 712(1)-712(M) to each cover a respective one of a plurality of side coverage areas 714(1)-714(M) in the coverage cell 702. Specifically, the main downlink RF beam 708 may be formed to cover the main coverage area 710 in a first geometric shape, and the side RF beams 712(1)-712(M) may be formed to cover the side coverage areas 714(1)-714(M) in at least one second geometric shape, which may be identical to or different from the first geometric shape.

With continuing reference to FIG. 7, the wireless device 700 can be controlled based on a plurality of codewords 716(1)-716(K) (K≥N+N×M) in a codebook 718 to provide multi-beam uniform coverage of the coverage cell 702. Each of the codewords 716(1)-716(K) is predetermined to cause the antenna array 704 to form the main RF beam 708 and the side RF beams 712(1)-712(N). In a non-limiting example, the codewords 716(1)-716(K) can include N main beam codewords and N×M side beam codewords. The N main beam codewords are each predetermined to cause the antenna array 704 to form the respective main RF beam 708. The N×M side beam codewords, on the other hand, are each predetermined to cause the antenna arrays 704 to form a respective one of the side RF beams 712(1)-712(M). The wireless device 700 may include a memory circuit 720, which can include a storage medium such as random-access memory (RAM), read-only memory (ROM), flash memory, solid-state disk (SSD), as an example, to store the codebook 718. In an embodiment, the codewords 716(1)-716(K) may be generated outside the wireless device 700 and programmed into the memory circuit 720 via a programming interface (not shown), such as a general-purpose input-output (GPIO) interface.

The wireless device 700 in this example also includes a control circuit 722, which can be a field-programmable gate array (FPGA) or an application specific integrated circuit (ASIC), as an example. The control circuit 722 is configured to receive a plurality of downlink channels 724D from a downlink communications link 726D for a service operator(s) (also known as a "carrier") as part of a downlink transmission signal (e.g., a control signal and/or a data signal) from a signal source (e.g., a base station, a central unit) and replicates the downlink channels 724D to generate one or more filtered downlink channels 724D-F based on the codebook 718. Specifically, to cause the antenna array 704 to form the respective main downlink RF beam 708, the control circuit 722 selects a respective one of the N main beam codewords from the codebook 718 and generates a respective one of the filtered downlink channels 724D-F based on the selected main beam codeword. Similarly, to cause the antenna array 704 to form a respective one of the side RF beams 712(1)-712(M), the control circuit 722 selects a respective one of the N×M side beam codewords from the codebook 718. A transmission circuit 723T generates a respective one of the filtered downlink signals 724D-F based on the selected side beam codeword to be distributed to the antenna array 704 to be radiated. The transmission circuit 723T can include RF circuits as part of a RF chain circuit, similar to or like the RF chain circuits 310(1)-310(E) in the WCS 300 in FIG. 3. The antenna array 704 is also configured to receive uplink channels 724U-F in uplink reception signals as a result of user devices communication to the wireless device 700 in response to reception of a downlink channel 724D from the wireless device 700. The wireless device 700 also includes a reception circuit 723R that is configured to receive and process the uplink channels 724U-F to then be distributed to the uplink communications link 726U. The uplink communications link 726U may be coupled directly or indirectly to a core network for a service provider or carrier as an example With continuing reference to FIG. 7, and in joint reference to the exemplary process 800 in FIG. 8, to provide for the capability of the wireless device 700, selectively control whether received transmit channels are transmitted through an antenna array 704 based on a temperature relating to the wireless device 700, the wireless device 700 in this example also includes a channel control circuit 722. The channel control circuit 722 can be a dedicated hardware circuit, a FPGA, or a processor that is configured to execute software/ firmware instructions, as examples. The channel control circuit 722 in this example includes a channel filter circuit 730 that is configured to receive the downlink channels 724D from the downlink communication link 726D (block 802 in FIG. 8). The channel control circuit 722 in this example also includes a channel determination circuit 732 that is configured to receive a temperature signal 734 from a temperature sensor 736 related to the wireless device 700 (block 804 in FIG. 8). For example, the temperature sensor 736 may be placed in the wireless device 700 and/or adjacent or on the antenna array 704 to measure the ambient temperature in its location. The temperature sensed by the temperature sensor 736 and communicated via the temperature signal 734 is representative of the temperature of the wireless device 700 and/or its antenna array 704, which is an indication of the effectiveness of heat dissipation by the wireless device 700 generated as a result of the electrical operation of its components, including the transmission circuit 723T and the reception circuit 723R.

With continuing reference to FIG. 8, the channel control circuit 722, and more particularly the channel filter circuit 730 is configured to filter the plurality of downlink channels 724D into one or more of filtered downlink channels 724D-F based on the indicated temperature from the temperature signal 734 (block 806 in FIG. 8). The channel filter circuit 730 is configured to filter the plurality of downlink channels 724D into one or more of filtered downlink channels 724D-F based on a downlink channel number signal 738 received from the channel determination circuit 732, which is determined based on the indicated temperature from the temperature sensor 736. The channel determination circuit 732 is configured to generate the downlink channel number signal 738 based on a determined number of downlink channels 724D to be transmitted to control the temperature of the wireless device 700. As discussed above, the temperature of the wireless device 700 is based on the EIRP of the wireless device 700, which is affected by the number of downlink channels 724D transmitted to the antenna array 704. The channel filter circuit 730 passes the filtered downlink channels 724D-F to the transmission circuit 723T, which in turn transmits the filtered downlink channels 724D-F to selected antenna elements 706(1)-706(E) of the antenna array 704 according to the beamforming configuration controlled by the selected codewords 716(1)-716(K) to be radiated in the coverage area 708 to a user device(s) (block 808 in FIG. 8). Note that only one coverage areas 708 is shown in FIG. 7, but there may be multiple coverage areas based on how the transmission circuit 723T transmits each filtered downlink channel 724D-F to a different set of antenna elements 706(1)-706(E) and at what power level based on the selected codewords 716(1)-716(K) for the filtered downlink channels 724D-F.

As further examples, the channel determination circuit 732 can use the temperature information contained in the temperature signal 734 to determine if the indicated temperature exceeds a predetermined temperature limit for the wireless device 700. The predetermined temperature limit may be stored in memory 720 for example. In response to the indicated temperature exceeding the predetermined temperature limit, the channel determination circuit 732 can be configured to determine the number of downlink channels 723T. The channel determination circuit 732 can provide this information in the downlink channel number signal 738 to the channel filter circuit 730. The channel filter circuit 730 can then use the information in the downlink channel number signal 738 to determine the downlink channels 724D, if any, to be filtered down to the filtered downlink channels 724D-F to be passed to the transmission circuit 723T to be transmitted. As an example, the channel filter circuit 730 can be configured to filter the plurality of downlink channels 724D into a subset of the plurality of downlink channels 724D as one or more filtered downlink channels 724D-F based on the ratio of a desired temperature of the wireless device 700 to the indicated temperature of the wireless device 700 in the temperature signal 734. This ratio can be linear or proportional. This technique of filtering allows the channel control circuit 722 to be configured to maintain the radiated power of the one or more antenna elements 706(1)-706(E) in the antenna array 704 independent of the filtering of the plurality of downlink channels 724D into one or more of the filtered downlink channels 724D-F. However, in this example, in response to the indicated temperature not exceeding the predetermined temperature limit, the channel determination circuit 732 can be configured to determine that the number of downlink channels 724D permitted to be transmitted should not be reduced.

In another example, it is possible for the channel control circuit 722 to utilize carrier aggregation (CA) as another method of filtering the downlink channels 724D into a subset of filtered downlink channels 724D-F if desired or necessary in response to the temperature of the wireless device 700. CA is implemented for LTE and 5G NR networks. For example, 3GPP Release 15 includes user equipment support of up to sixteen (16) Component Carriers (CC) in the CA mode for a first frequency band FR1 and a second frequency band FR2 that can be transmitted and received in parallel including support for different bandwidth and other parameters for CCs.

In this regard, channel control circuit 722 can be configured to receive the plurality of downlink channels 724D as a plurality of downlink component carriers (CCs). The plurality of downlink CCs can include a primary (main) CC and one or more secondary CCs. In response to the indicated temperature exceeding the predetermined temperature limit, the channel filter circuit 730 can be configured to filter out at least one downlink component carrier (e.g., a secondary CC(s)) from the plurality of downlink component carriers (e.g., that includes both primary (main) CC and secondary CC(s)) in the downlink channels 724D to provide one or more filtered downlink component carriers (e.g. the primary (main) CC) as the filtered downlink channels 724D-F. The transmission circuit 723T can transmit each of the one or more filtered downlink component carriers to the one or more antenna elements 706(1)-706(E) in the antenna array 704 to form one or more signal coverage areas 708, each corresponding to a respective filtered downlink component carrier of the one or more filtered downlink component carriers. The plurality of downlink component carriers in the downlink channels 724D may include an intra-band CA scheme that includes at least two (2) contiguous downlink component carriers in the same frequency band and/or at least two (2) non-contiguous downlink component carriers in the same frequency band. The plurality of downlink component carriers in the downlink channels 724D may include an inter-band CA scheme wherein the downlink channels 724D include at least two (2) downlink component carriers in different frequency bands.

In another example, the channel control circuit 722 can be configured to pass a relatively narrow bandwidth for a main CC in the downlink channels 724D that is referred to in 3GPP documents as the primary cell (PCell), but switch on/off one or more of secondary CCs in the downlink channels 724D, referred to as secondary cells (SCells). For CA, the PCell and all SCells can be from the same base station (e.g., gNB), because in the case of for intra-band CA, strict requirements may be applied for synchronization. For the second frequency band FR2, the normal case is having PCells and SCells signals transmitted by the same wireless devices 700. However, the channel control circuit 772228 can be configured to filter the SCell(s) distributed to multiple wireless devices 700 in a CC mode. According to CA protocols, SCells can be rapidly activated or deceived to meet the variations in the traffic pattern. Thus, the channel control circuit 722 can be configured to use CA mechanism to filter out an SCell(s) as a way to filter downlink channels 724D in response to temperatures exceeding defined limits, by making decisions regarding deactivation and/or bandwidth change of SCells. In an example, this CA procedure can be performed by the channel control circuit 722 in a media access control (MAC) layer, i.e., it is transparent for upper communication layers. The wireless device 700 can include a MAC layer that can perform CA management. For a simplified wireless device 700 that provides only RF services for an upper communication layer, blocking and/or filtering out downlink channels 724D allocated to SCells will be automatically translated back to the network as temporary issue with SCell allocation. The result is that the network will perform radio resource reconfiguration for users that were affected by those SCell downlink channels 724D that were blocked to provide service using the PCell and/or rest of SCells.

Figure 9:
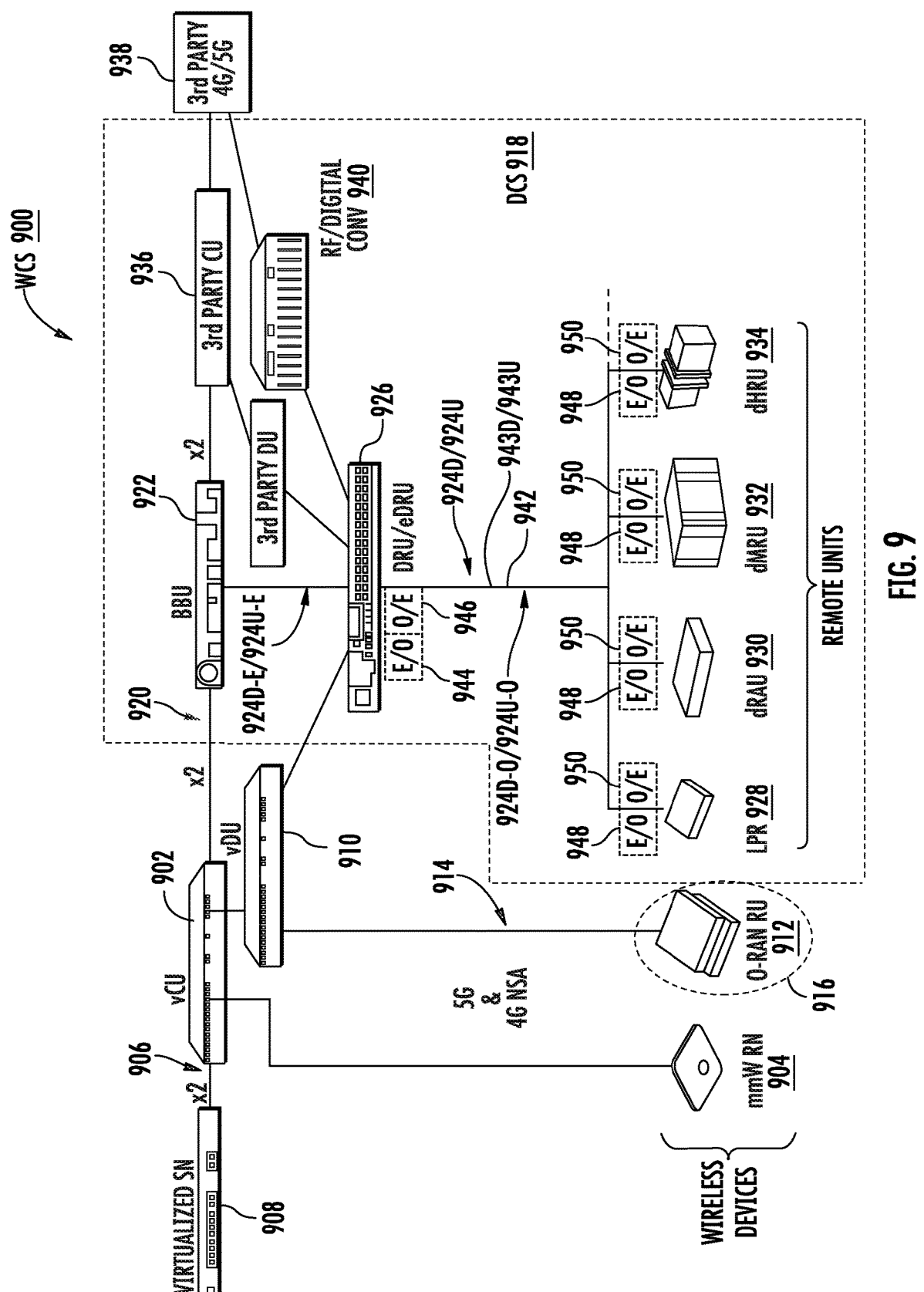
FIG. 9 is a schematic diagram of an exemplary WCS that can include wireless devices, including the wireless device in FIG. 7, of which any can be configured to selectively control whether received transmit channels are transmitted through an antenna array based on a temperature of the wireless device.

FIG. 9 is a schematic diagram of an exemplary WCS 900 that can include one or more wireless devices according to any of the embodiments disclosed herein, including but not limited to the wireless device 700 in FIG. 7, and configured to selectively control whether received transmit channels are transmitted through an antenna array based on a temperature of the wireless device. The WCS 900 supports both legacy 4G LTE, 4G/5G non-standalone (NSA), and 5G standalone communications systems. As shown in FIG. 9, a centralized services node 902 is provided that is configured to interface with a core network to exchange communications data and distribute the communications data as radio signals to remote units. In this example, the centralized services node 902 is configured to support distributed communications services to an mmWave radio node 904. The mmWave radio node 904 is an example of a wireless device that can be configured to selectively control whether received transmit channels are transmitted through an antenna array based on a temperature. Despite that only one of the mmWave radio node 904 is shown in FIG. 9, it should be appreciated that the WCS 900 can be configured to include additional mmWave radio nodes 904, as needed. The functions of the centralized services node 902 can be virtualized through an x2 interface 906 to another services node 908. The centralized services node 902 can also include one or more internal radio nodes that are configured to be interfaced with a distribution unit (DU) 910 to distribute communications signals (e.g., communications channels) to one or more open radio access network (O-RAN) remote units (RUs) 912 that are configured to be communicatively coupled through an O-RAN interface 914. The O-RAN RUs 912 are another example of a wireless device that can be configured to selectively control whether received transmit channels are transmitted through an antenna array based on a temperature. The O-RAn RUs 912 are each configured to communicate downlink and uplink communications signals in coverage cell(s) 916.

The centralized services node 902 can also be interfaced with a distributed communications system (DCS) 918 through an x2 interface 920. Specifically, the centralized services node 902 can be interfaced with a digital baseband unit (BBU) 922 that can provide a digital signal source to the centralized services node 902. The digital BBU 922 may be configured to provide a signal source to the centralized services node 902 to provide electrical downlink communications signals 924D-E (electrical downlink communications signals 924D-E can include downlink channels) to a digital routing unit (DRU) 926 as part of a digital distributed antenna system (DAS). The DRU 926 is configured to split and distribute the electrical downlink communications signals 924D-E to different types of remote wireless devices, including a low-power remote unit (LPR) 928, a radio antenna unit (dRAU) 930, a mid-power remote unit (dMRU) 932, and/or a high-power remote unit (dHRU) 934. The DRU 926 is also configured to combine electrical uplink communications signals 924U-E (electrical uplink communications signals 924U-E can include uplink channels) received from the LPR 928, the dRAU 930, the dMRU 932, and/or the dHRU 934 and provide the combined electrical uplink communications signals 924U-E to the digital BBU 922. The digital BBU 922 is also configured to interface with a third-party central unit 936 and/or an analog source 938 through a radio frequency (RF)/digital converter 940.

The DRU 926 may be coupled to the LPR 928, the dRAU 930, the dMRU 932, an/or the dHRU 934 via an optical fiber-based communications medium 942 that includes optical downlink communications links 943D and optical uplink communications links 943U. In this regard, the DRU 926 can include a respective electrical-to-optical (E/O) converter 944 and a respective optical-to-electrical (O/E) converter 946. Likewise, each of the LPR 928, the dRAU 930, the dMRU 932, and the dHRU 934 can include a respective E/O converter 948 and a respective O/E converter 950.

The E/O converter 944 at the DRU 926 is configured to convert the electrical downlink communications signals 924D-E into optical downlink communications signals 924D-O for distribution to the LPR 928, the dRAU 930, the dMRU 932, and/or the dHRU 934 via the optical fiber-based communications medium 942. The O/E converter 950 at each of the LPR 928, the dRAU 930, the dMRU 932, and/or the dHRU 934 is configured to convert the optical downlink communications signals 924D-O back to the electrical downlink communications signals 924D-E. The E/O converter 948 at each of the LPR 928, the dRAU 930, the dMRU 932, and the dHRU 934 is configured to convert the electrical uplink communications signals 924U-E into optical uplink communications signals 924U-O. The O/E converter 946 at the DRU 926 is configured to convert the optical uplink communications signals 942U-O back to the electrical uplink communications signals 924U-E.

Figure 10:
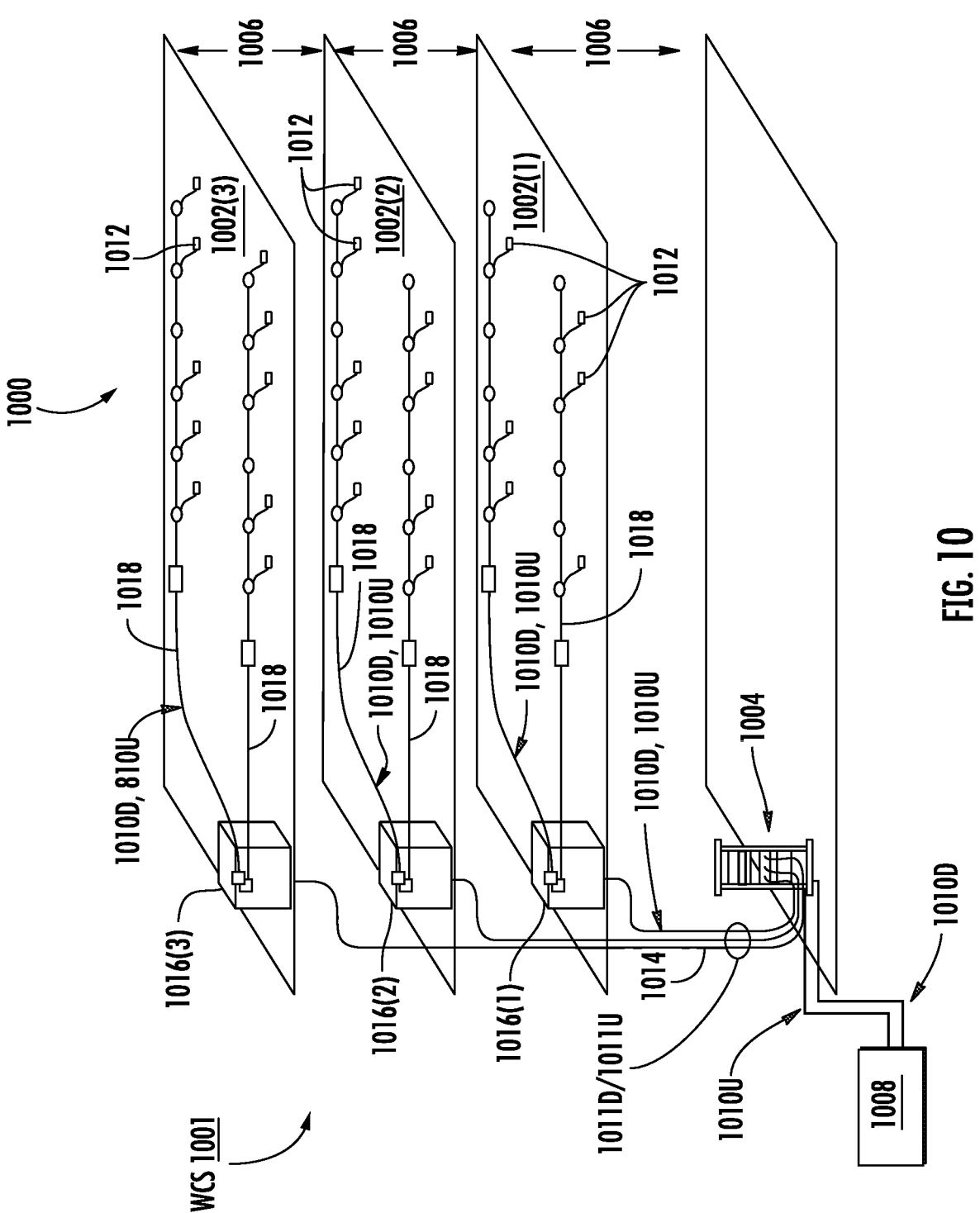
FIG. 10 is a partial schematic cut-away diagram of an exemplary building infrastructure that includes a WCS, including but not limited to the WCS of FIGS. 3 and 9, wherein the WCS includes one or more wireless devices, including but not limited to the wireless device in FIG. 7, configured to selectively control whether received transmit channels are transmitted through an antenna array based on a temperature of the wireless device.

FIG. 10 is a partial schematic cut-away diagram of an exemplary building infrastructure 1000 that includes an exemplary WCS 1002 that can include one or more wireless devices according to any of the embodiments disclosed herein, including but not limited to the wireless device 700 in FIG. 7, and configured to selectively control whether received transmit channels are transmitted through an antenna array based on a temperature of the wireless device. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004 is communicatively coupled to a base station 1008 to receive downlink communications signals 1010D (downlink communications signals 1010D can include downlink channels) over an optical downlink communications link 1011D from the base station 1008. The central unit 1004 is communicatively coupled to a plurality of remote units 1012 to distribute the downlink communications signals 1010D over the optical downlink communications link 1011D to the remote units 1012 and to receive uplink communications signals 1010U (uplink communications signals 1010U can include uplink channels) over an optical uplink communications link 1011U from the remote units 1012, as previously discussed above. The remote units 1012 can be wireless devices that are configured to selectively control whether received transmit channels are transmitted through an antenna array based on a temperature of the wireless device, including but not limited to the wireless device 700 in FIG. 7. The downlink communications signals 1010D and the uplink communications signals 1010U communicated between the central unit 1004 and the remote units 1012 are carried over a riser cable 1014 that has the optical downlink communications links 1011D and optical uplink communications links 1011U. The riser cable 1014 may be routed through interconnect units (ICUs) 1016(1)-1016(3) dedicated to each of the floors 1002(1)-1002(3) that route the downlink communications signals 1010D and the uplink communications signals 1010U to the remote units 1012 and also provide power to the remote units 1012 via array cables 1018.

A wireless device, including but not limited to the wireless device 700 in FIG. 7, that is configured to selectively control whether received transmit channels are transmitted through an antenna array based on a temperature of the wireless devices, can also be provided as different types of radio nodes of service providers and/or supporting service providers, including macrocell systems, small cell systems, and remote radio heads (RRH) systems, as examples. For example, FIG. 11 is a schematic diagram of an exemplary mobile telecommunications environment 1100 (also referred to as "environment 1100") that includes radio nodes and cells that are configured to selectively control whether received transmit channels are transmitted through an antenna array based on a temperature of the wireless devices, including but not limited to the wireless device 700 in FIG. 7.

The environment 1100 includes exemplary macrocell RANs 1102(1)-1102(M) ("macrocells 1102(1)-1102(M)") and an exemplary small cell RAN 1104 located within an enterprise environment 1106 and configured to service mobile communications between a user mobile communications device 1108(1)-1108(N) to a mobile network operator (MNO) 1110. A serving RAN for the user mobile communications devices 1108(1)-1108(N) is a RAN or cell in the RAN in which the user mobile communications devices 1108(1)-1108(N) have an established communications session with the exchange of mobile communications signals for mobile communications. Thus, a serving RAN may also be referred to herein as a serving cell. For example, the user mobile communications devices 1108(3)-1108(N) in FIG. 11 are being serviced by the small cell RAN 1104, whereas the user mobile communications devices 1108(1) and 1108(2) are being serviced by the macrocell 1102. The macrocell 1102 is an MNO macrocell in this example. The macrocell 1102 can be or include a wireless device(s) that can be configured to selectively control whether received transmit channels are transmitted through an antenna array based on a temperature of the wireless device. However, a shared spectrum RAN 1103 (also referred to as "shared spectrum cell 1103") includes a macrocell in this example and supports communications on frequencies that are not solely licensed to a particular MNO, such as CBRS for example, and thus may service user mobile communications devices 1108(1)-1108(N) independent of a particular MNO. The macrocell 1102 can be or include a wireless device(s) that can be configured to selectively control whether received transmit channels are transmitted through an antenna array based on a temperature of the wireless device.

This can be a wireless device that can be configured to selectively control whether received transmit channels are transmitted through an antenna array based on a temperature of the wireless device. For example, the shared spectrum cell 1103 may be operated by a third party that is not an MNO and wherein the shared spectrum cell 1103 supports CBRS. The MNO macrocell 1102, the shared spectrum cell 1103, and the small cell RAN 1104 may be neighboring radio access systems to each other, meaning that some or all can be in proximity to each other such that a user mobile communications device 1108(3)-1108(N) may be able to be in communications range of two or more of the MNO macrocell 1102, the shared spectrum cell 1103, and the small cell RAN 1104 depending on the location of the user mobile communications devices 1108(3)-1108(N).

Figure 11:
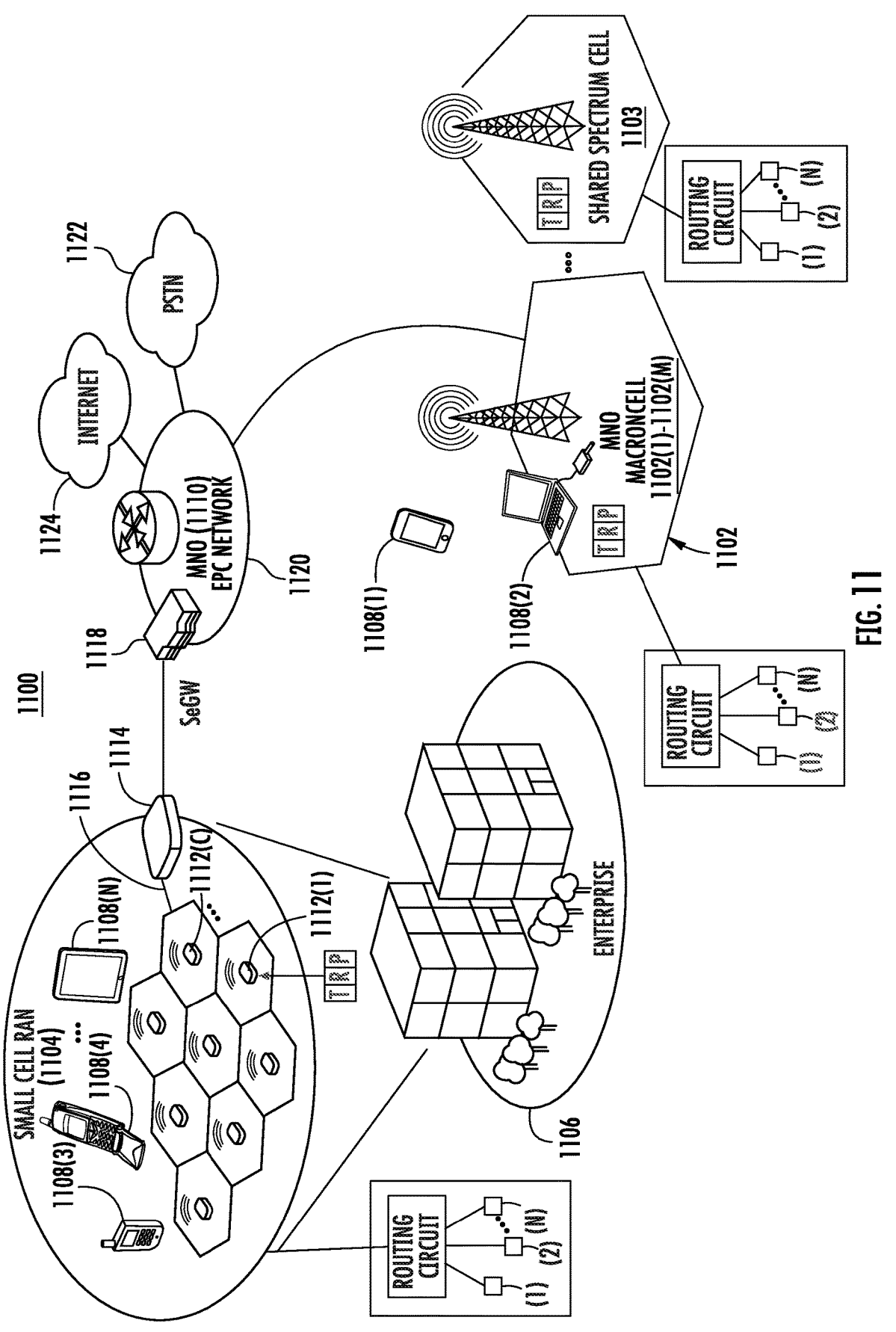
FIG. 11 is a schematic diagram of an exemplary mobile telecommunications environment that can include a WCS, including but not limited to the WCS of FIGS. 3 and 9, wherein the WCS includes one or more wireless devices, including but not limited to the wireless device in FIG. 7, configured to selectively control whether received transmit channels are transmitted through an antenna array based on a temperature of the wireless device.

In FIG. 11, the mobile telecommunications environment 1100 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1100 includes the enterprise environment 1106 in which the small cell RAN 1104 is implemented. The small cell RAN 1104 includes a plurality of small cell radio nodes 1112(1)-1112(C), which are wireless devices that can be configured to selectively control whether received transmit channels are transmitted through an antenna array based on a temperature of the wireless devices. Each small cell radio node 1112(1)-1112(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 11, the small cell RAN 1104 includes one or more services nodes (represented as a single services node 1114) that manage and control the small cell radio nodes 1112(1)-1112(C). In alternative implementations, the management and control functionality may be incorporated into a radio node, distributed among nodes, or implemented remotely (i.e., using infrastructure external to the small cell RAN 1104). The small cell radio nodes 1112(1)-1112(C) are coupled to the services node 1114 over a direct or local area network (LAN) connection 1116 as an example, typically using secure IPsec tunnels. The small cell radio nodes 1112(1)-1112(C) can include multi-operator radio nodes. The services node 1114 aggregates voice and data traffic from the small cell radio nodes 1112(1)-1112(C) and provides connectivity over an IPsec tunnel to a security gateway (SeGW) 1118 in a network 1120 (e.g., evolved packet core (EPC) network in a 4G network, or 5G Core in a 5G network) of the MNO 1110. The network 1120 is typically configured to communicate with a public switched telephone network (PSTN) 1122 to carry circuit-switched traffic, as well as for communicating with an external packet-switched network such as the Internet 1124.

The environment 1100 also generally includes a node (e.g., eNodeB or gNodeB) base station, or "macrocell" 1102. The radio coverage area of the macrocell 1102 is typically much larger than that of a small cell where the extent of coverage often depends on the base station configuration and surrounding geography. Thus, a given user mobile communications device 1108(3)-1108(N) may achieve connectivity to the network 1120 (e.g., EPC network in a 4G network, or 5G Core in a 5G network) through either a macrocell 1102 or small cell radio node 1112(1)-1112(C) in the small cell RAN 1104 in the environment 1100.

Figure 12:
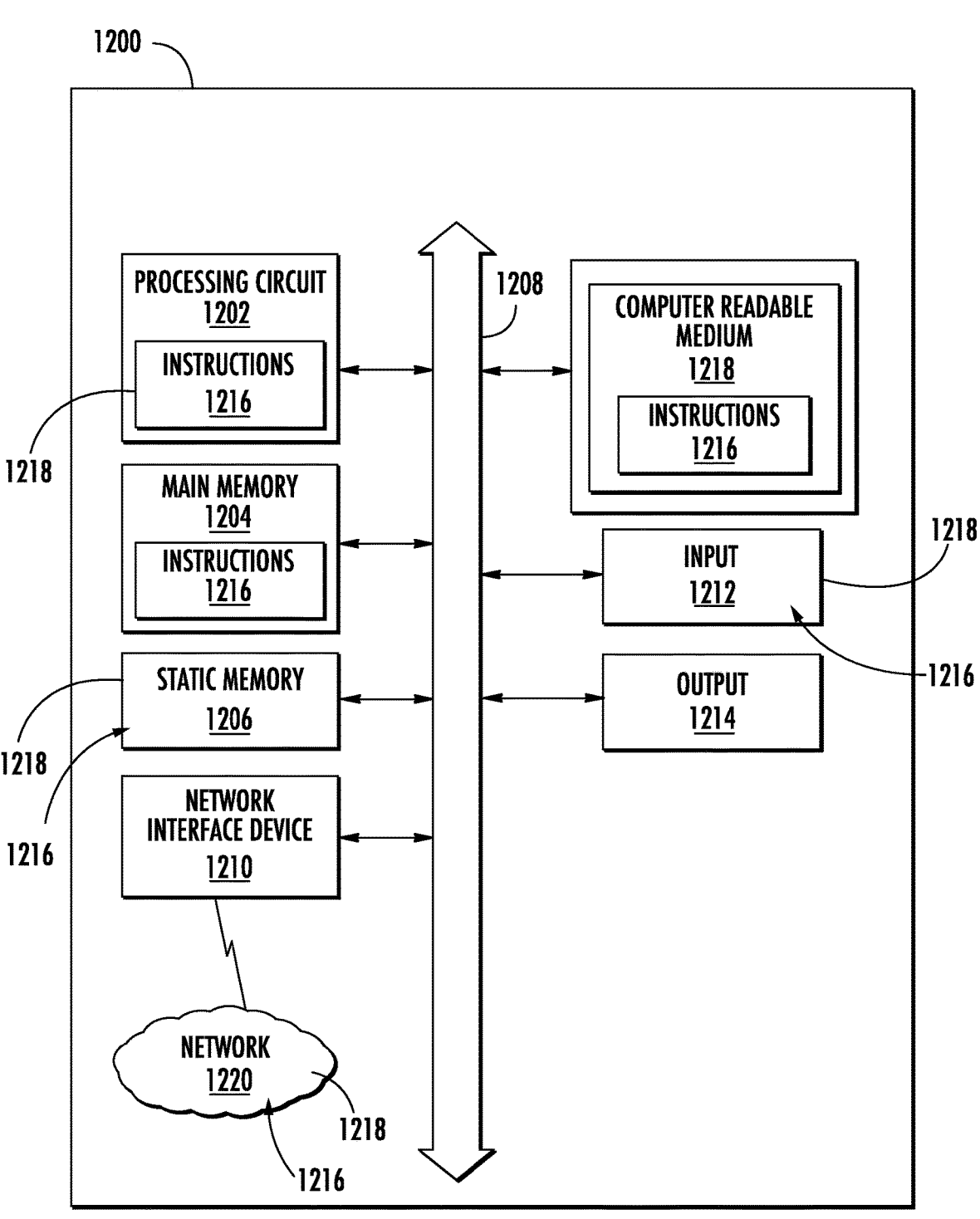
FIG. 12 is a schematic diagram of a representation of an exemplary computer system that can be included in or interfaced with any of the components in a WCS, including but not limited to the WCS of FIGS. 3 and 9, and that can be included in or interfaced with any of the components of a wireless device, including but not limited to the wireless device in FIG. 7, that is configured to selectively control whether received transmit channels are transmitted through an antenna array based on a temperature of the wireless device, wherein the exemplary computer system is configured to execute instructions from an exemplary computer-readable medium.

Any of the circuits in a wireless device configured to selectively control whether received transmit channels are transmitted through an antenna array based on a temperature of the wireless devices, including but not limited to wireless device 700 of FIG. 7 and/or its channel control circuit 722, can include or be included in a computer system 1200, such as that shown in FIG. 12, to carry out their functions and operations as described herein. With reference to FIG. 12, the computer system 1200 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1200 in this embodiment includes a processing circuit or processor 1202, a main memory 1204 (e.g., read-only memory (ROM), flash memory, dynamic random access memory (DRAM) such as synchronous DRAM (SDRAM), etc.), and a static memory 1206 (e.g., flash memory, static random access memory (SRAM), etc.), which may communicate with each other via a data bus 1208. Alternatively, the processing circuit 1202 may be connected to the main memory 1204 and/or static memory 1206 directly or via some other connectivity means. The processing circuit 1202 may be a controller, and the main memory 1204 or static memory 1206 may be any type of memory.

The processing circuit 1202 represents one or more general-purpose processing circuits such as a microprocessor, central processing unit, or the like. More particularly, the processing circuit 1202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1202 is configured to execute processing logic in instructions 1216 for performing the operations and steps discussed herein.

The computer system 1200 may further include a network interface device 1210. The computer system 1200 also may or may not include an input 1212 to receive input and selections to be communicated to the computer system 1200 when executing instructions. The computer system 1200 also may or may not include an output 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processing circuit 1202 during execution thereof by the computer system 1200, the main memory 1204 and the processing circuit 1202 also constituting the computer-readable medium 1218. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components and/or systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented as electronic hardware, instructions stored in memory or in another computer-readable medium and executed by a processor or other processing device, or combinations of both. The various illustrative logical blocks, modules, and circuits described in connection with the embodiments disclosed herein may be implemented with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein, as examples. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A wireless device, comprising:
a channel control circuit configured to:
   receive a plurality of downlink channels to be transmitted;
   receive a temperature signal indicating a temperature related to the wireless device; and
   filter the plurality of downlink channels into one or more of filtered downlink channels based on the indicated temperature, wherein the filtering comprises blocking at least one of the plurality of downlink channels from being transmitted such that a number of downlink channels transmitted is reduced; and
a transmission circuit configured to:
   transmit each of the one or more filtered downlink channels to one or more antenna elements in an antenna array to form one or more signal coverage areas each corresponding to a respective filtered downlink channel of the one or more filtered downlink channels.

2. The wireless device of claim 1, wherein the channel control circuit is further configured to:
   determine if the indicated temperature exceeds a predetermined temperature limit for the wireless device; and
   in response to the indicated temperature exceeding the predetermined temperature limit, filter the plurality of downlink channels into a subset of the plurality of downlink channels comprising the one or more filtered downlink channels.

3. The wireless device of claim 2, wherein the channel control circuit is further configured to, in response to the indicated temperature not exceeding the predetermined temperature limit, not filter the plurality of downlink channels such that the one or more filtered downlink channels comprises the plurality of downlink channels.

4. The wireless device of claim 1, wherein the channel control circuit is configured to filter the plurality of downlink channels into a subset of the plurality of downlink channels comprising the one or more filtered downlink channels based on a ratio of a desired temperature of the wireless device to the indicated temperature of the wireless device.

5. The wireless device of claim 1, wherein the channel control circuit is configured to filter the plurality of downlink channels into a subset of the plurality of downlink channels comprising the one or more filtered downlink channels in the same ratio of a desired temperature of the wireless device to the indicated temperature of the wireless device.

6. The wireless device of claim 1, wherein the channel control circuit is further configured to maintain the radiated power of the one or more antenna elements in the antenna array independent of the filtering of the plurality of downlink channels into one or more of filtered downlink channels based on the indicated temperature.

7. The wireless device of claim 2, wherein: the channel control circuit is configured to:

receive the plurality of downlink channels comprising a plurality of downlink component carriers; and in response to the indicated temperature exceeding the predetermined temperature limit, filter out at least one downlink component carrier from the plurality of downlink component carriers to provide one or more filtered downlink component carriers; and a transmission circuit is configured to:

transmit each of the one or more filtered downlink channels by being configured to transmit each of the one or more filtered downlink component carriers to the one or more antenna elements in the antenna array to form the one or more signal coverage areas each corresponding a respective filtered downlink component carrier of the one or more filtered downlink component carriers.

8. The wireless device of claim 7, wherein: the plurality of downlink component carriers comprises a primary component carrier and one or more secondary component carriers; and the one or more filtered downlink component carriers does not comprise at least one secondary component carrier of the one or more secondary component carriers.

9. The wireless device of claim 7, wherein the plurality of downlink component carriers comprises at least two contiguous downlink component carriers in the same frequency band.

10. The wireless device of claim 7, wherein the plurality of downlink component carriers comprises at least two non-contiguous downlink component carriers in the same frequency band.

11. The wireless device of claim 7, wherein the plurality of downlink component carriers comprises at least two downlink component carriers in different frequency bands.

12. The wireless device of claim 7, wherein the channel control circuit is configured to receive the plurality of downlink component carriers from the same base station.

13. The wireless device of claim 1, further comprising a temperature sensor configured to: measure the ambient temperature of the wireless device; and generate the temperature signal indicating the temperature related to the wireless device.

14. The wireless device of claim 1, wherein the channel control circuit comprises:

a channel determination circuit configured to: receive the temperature signal indicating the temperature related to the wireless device;

determine the number of downlink channels of the plurality of downlink channels to be transmitted based on the indicated temperature; and generate a downlink channel number signal based on the determined number of downlink channels; and a channel filter circuit configured to:

filter the plurality of downlink channels into the one or more filtered downlink channels based on the downlink channel number signal.

15. The wireless device of claim 1 configured to:

select one or more beam codewords for forming one or more filtered RF beams corresponding to the respective one or more filtered downlink channels; and the transmission circuit configured to:

transmit each of the one or more filtered RF beams to the one or more antenna elements in the antenna array to form the one or more signal coverage areas each corresponding a respective filtered downlink channel of the one or more filtered downlink channels based on the selected one or more codewords.

16. The wireless device of claim 1, wherein the wireless device comprises radio device comprised from the group consisting of a small cell radio and a base station.

17. A method of selectively controlling transmission of communications channels through an antenna array in a wireless communications system (WCS), comprising:

receiving a plurality of downlink channels to be transmitted;

receiving a temperature signal indicating a temperature related to a wireless device;

filtering the plurality of downlink channels into one or more of filtered downlink channels based on the indicated temperature, wherein the filtering comprises blocking at least one of the plurality of downlink channels from being transmitted such that a number of downlink channels transmitted is reduced; and transmitting each of the one or more filtered downlink channels to one or more antenna elements in an antenna array to form one or more signal coverage areas each corresponding a respective filtered downlink channel of the one or more filtered downlink channels.

18. The method of claim 17, further comprising:

determining if the indicated temperature exceeds a predetermined temperature limit for the wireless device; and filtering the plurality of downlink channels into a subset of the plurality of downlink channels comprising the one or more filtered downlink channels, in response to the indicated temperature exceeding the predetermined temperature limit.

19. The method of claim 18, further comprising not filtering the plurality of downlink channels such that the one or more filtered downlink channels comprises the plurality of downlink channels.

20. The method of claim 18, comprising filtering the plurality of downlink channels into a subset of the plurality of downlink channels comprising the one or more filtered downlink channels based on a ratio of a desired temperature of the wireless device to the indicated temperature of the wireless device.

21. The method of claim 18, wherein:

receiving the plurality of downlink channels comprising receiving a plurality of downlink component carriers;

filtering the plurality of downlink channels into the subset of the plurality of downlink channels comprises filtering out at least one downlink component carrier from the plurality of downlink component carriers to provide one or more filtered downlink component carriers; and transmitting each of the one or more filtered downlink channels comprises transmitting each of the one or more filtered downlink component carriers to the one or more antenna elements in the antenna array to form the one or more signal coverage areas each corresponding a respective filtered downlink component carrier of the one or more filtered downlink component carriers.

22. The method of claim 18, further comprising:
measuring the ambient temperature of the wireless device; and generating the temperature signal indicating the temperature related to the wireless device.

23. The method of claim 18, further comprising:
determining the number of downlink channels of the plurality of downlink channels to be transmitted based on the indicated temperature;
generating a downlink channel number signal based on the determined number of downlink channels; and wherein:
   filtering the plurality of downlink channels into the one or more filtered downlink channels comprises filtering the plurality of downlink channels into the one or more filtered downlink channels based on the downlink channel number signal.

24. A wireless communications system (WCS), comprising:
a central unit configured to:
   distribute a plurality of downlink channels over a plurality of downlink communications links to a plurality of wireless devices; and
   distribute a plurality of uplink channels from the plurality of wireless devices received on a plurality of uplink communications links; a plurality of antenna arrays; and
   the plurality of wireless devices each configured to:
   receive a first plurality of downlink channels of the plurality of downlink channels to be transmitted from a downlink communications link of the plurality of downlink communications links;
   receive a temperature signal indicating a temperature related to the wireless device;
   filter the first plurality of downlink channels into first one or more filtered downlink channels based on the indicated temperature, wherein filtering comprises blocking at least one of the first plurality of downlink channels from being transmitted such that a number of downlink channels transmitted is reduced;
   transmit each of the first one or more filtered downlink channels to one or more antenna elements in an antenna array of the plurality of antenna arrays to form one or more signal coverage areas each corresponding a respective first filtered downlink channel of the first one or more filtered downlink channels;
   receive a first plurality of uplink channels; and distribute the first plurality of uplink channels of the plurality of uplink channels on the first uplink communication link of the plurality of uplink communications links to the central unit.

25. The WCS of claim 24, wherein each wireless device of the plurality of wireless devices is further configured to:
   determine if the indicated temperature exceeds a predetermined temperature limit for the wireless device; and
   in response to the indicated temperature exceeding the predetermined temperature limit, filter the plurality of downlink channels into a subset of the plurality of downlink channels comprising the one or more filtered downlink channels.

26. The WCS of claim 25, wherein each wireless device of the plurality of wireless devices is further configured to not filter the plurality of downlink channels such that the one or more filtered downlink channels comprises the plurality of downlink channels.

27. The WCS of claim 25, wherein:
the central unit is configured to distribute the plurality of downlink channels each comprising a plurality of downlink component carriers over the plurality of downlink communications links to the plurality of wireless devices; and
each wireless device of the plurality of wireless devices is configured to:
   receive the first plurality of downlink channels comprising a first plurality of downlink component carriers of the plurality of downlink component carriers; and
   in response to the indicated temperature exceeding the predetermined temperature limit, filter out at least one first downlink component carrier from the first plurality of downlink component carriers to provide first one or more filtered downlink component carriers; and
   transmit each of the first one or more filtered downlink channels by being configured to transmit each of the first one or more filtered downlink component carriers to the one or more antenna elements in the antenna array to form one or more signal coverage areas each corresponding a respective first filtered downlink component carrier of the first one or more filtered downlink component carriers.

28. The WCS of claim 27, wherein the central unit is configured to receive the plurality of downlink component carriers from the same base station.

29. The WCS of claim 24, wherein the plurality of wireless devices each comprises radio device comprised from the group consisting of a small cell radio and a base station.

30. The WCS of claim 24, wherein:
the plurality of downlink communications links comprise a plurality of optical downlink communications links;
the plurality of uplink communications links comprise a plurality of optical uplink communications links; and
the central unit further comprises:
   one or more electrical-to-optical (E-O) converters configured to convert the received plurality of downlink channels comprising a plurality of electrical downlink channels into a plurality of optical downlink channels; and one or more optical-to-electrical (O-E) converters configured to convert the received plurality of uplink channels comprising a plurality of optical uplink channels into a plurality of electrical uplink channels;
   the central unit configured to:
   distribute the plurality of optical downlink channels from the one or more E-O converters to the plurality of optical downlink communications links; and
   distribute the plurality of optical uplink channels from the one or more optical uplink communications links to the one or more O-E converters;

each wireless device among the plurality of wireless devices further comprises:

one or more optical-to-electrical (O-E) converters configured to convert the plurality of optical downlink channels into the plurality of electrical downlink channels; and one or more electrical-to-optical (E-O) converters configured to convert the plurality of electrical uplink channels into the plurality of optical uplink channels; and each wireless device among the plurality of wireless devices is configured to:

receive a first plurality of optical downlink channels of the plurality of optical downlink channels from the downlink communications link of the plurality of downlink communications links;

filter the first plurality of electrical downlink channels into first one or more filtered downlink channels comprising a first one or more filtered electrical optical downlink channels based on the indicated temperature;

transmit each of the first one or more filtered electrical downlink channels to one or more antenna elements in an antenna array of the plurality of antenna arrays to form the one or more signal coverage areas each corresponding a respective first filtered electrical downlink channel of the first one or more filtered electrical downlink channels;

receive the first plurality of uplink channels comprising a first plurality of electrical uplink channels; and distribute the first plurality of optical uplink channels of the plurality of optical uplink channels on the first optical uplink communication link of the plurality of optical uplink communications links to the central unit.

31. The WCS of claim 24 comprising a distributed antenna system (DAS), wherein the plurality of wireless devices comprises a plurality of remote antenna units (RAUs).

32. The WCS of claim 24 comprising a small cell radio access network (RAN), wherein the plurality of wireless devices comprises a plurality of radio access nodes.

33. The WCS of claim 24 comprising a radio access network (RAN), wherein the plurality of wireless devices comprises a plurality of remote radio heads (RRHs).

* * * * *